(12) United States Patent
Cvetkovich

(10) Patent No.: US 12,567,116 B2
(45) Date of Patent: Mar. 3, 2026

---

(54) TAX-ADVANTAGED BUSINESS OWNERSHIP TRANSFER SYSTEM

(71) Applicant: Benjamin M. Cvetkovich, Loveland, CO (US)

(72) Inventor: Benjamin M. Cvetkovich, Loveland, CO (US)

( * ) Notice: Subject to any disclaimer, the term of this patent is extended or adjusted under 35 U.S.C. 154(b) by 0 days.

(21) Appl. No.: 19/244,297

(22) Filed: Jun. 20, 2025

(65) Prior Publication Data

US 2025/0390957 A1 Dec. 25, 2025

Related U.S. Application Data

(60) Provisional application No. 63/662,845, filed on Jun. 21, 2024.

(51) Int. Cl.
| | |
|---|---|
| *G06Q 40/00* | (2023.01) |
| *G06Q 10/0635* | (2023.01) |
| *G06Q 30/0201* | (2023.01) |
| *G06Q 40/02* | (2023.01) |
| *G06Q 40/10* | (2023.01) |
| *G06Q 50/26* | (2012.01) |

(52) U.S. Cl.
CPC .......... *G06Q 40/10* (2013.01); *G06Q 10/0635* (2013.01); *G06Q 30/0206* (2013.01); *G06Q 40/02* (2013.01); *G06Q 50/26* (2013.01)

(58) Field of Classification Search
CPC .............. G06Q 40/10; G06Q 10/0635; G06Q 30/0206; G06Q 40/02; G06Q 50/26
USPC .......................................... 705/16
See application file for complete search history.

(56) References Cited

U.S. PATENT DOCUMENTS

| | | | |
|---|---|---|---|
| 2003/0093345 A1* | 5/2003 | Cutbirth ................ | G06Q 40/02 705/35 |
| 2010/0023436 A1* | 1/2010 | Weild, IV ............. | G06Q 40/06 705/35 |

FOREIGN PATENT DOCUMENTS

| | | | |
|---|---|---|---|
| KR | 102160680 B1 * | 9/2020 | ............. G06Q 40/12 |

OTHER PUBLICATIONS

<https://milkeninstitute.org/sites/default/files/2022-02/Catastrophic%20Risk%20-%20Cat%20Bonds%20%26%20Beyond_FIL_04.08%20%281%29.pdf> (Year: 2008).*

* cited by examiner

*Primary Examiner* — Russell S Glass

(57) ABSTRACT

The present disclosure provides a system for facilitating tax-advantaged business transactions with automated risk mitigation. The system generates a conditional sales agreement between a government entity and a business entity for a term of one year or less, with asset transfer delayed until full payment. A net revenue bond is structured with interest obligations exceeding available business profits, creating a perpetual default condition preventing asset transfer completion. The system processes payments, calculates tax savings by comparing ownership structures, and distributes funds while maintaining the perpetual default condition. Geographic information system data is received and correlated with business metrics to generate risk scores. Payment processing and fund distribution automatically adjust based on these scores. When risk scores exceed thresholds, exit procedures are triggered, with the perpetual default condition enabling immediate termination without unwinding transfers. This structure provides tax advantages while protecting all parties through automated risk management.

20 Claims, 10 Drawing Sheets

Figure 4:
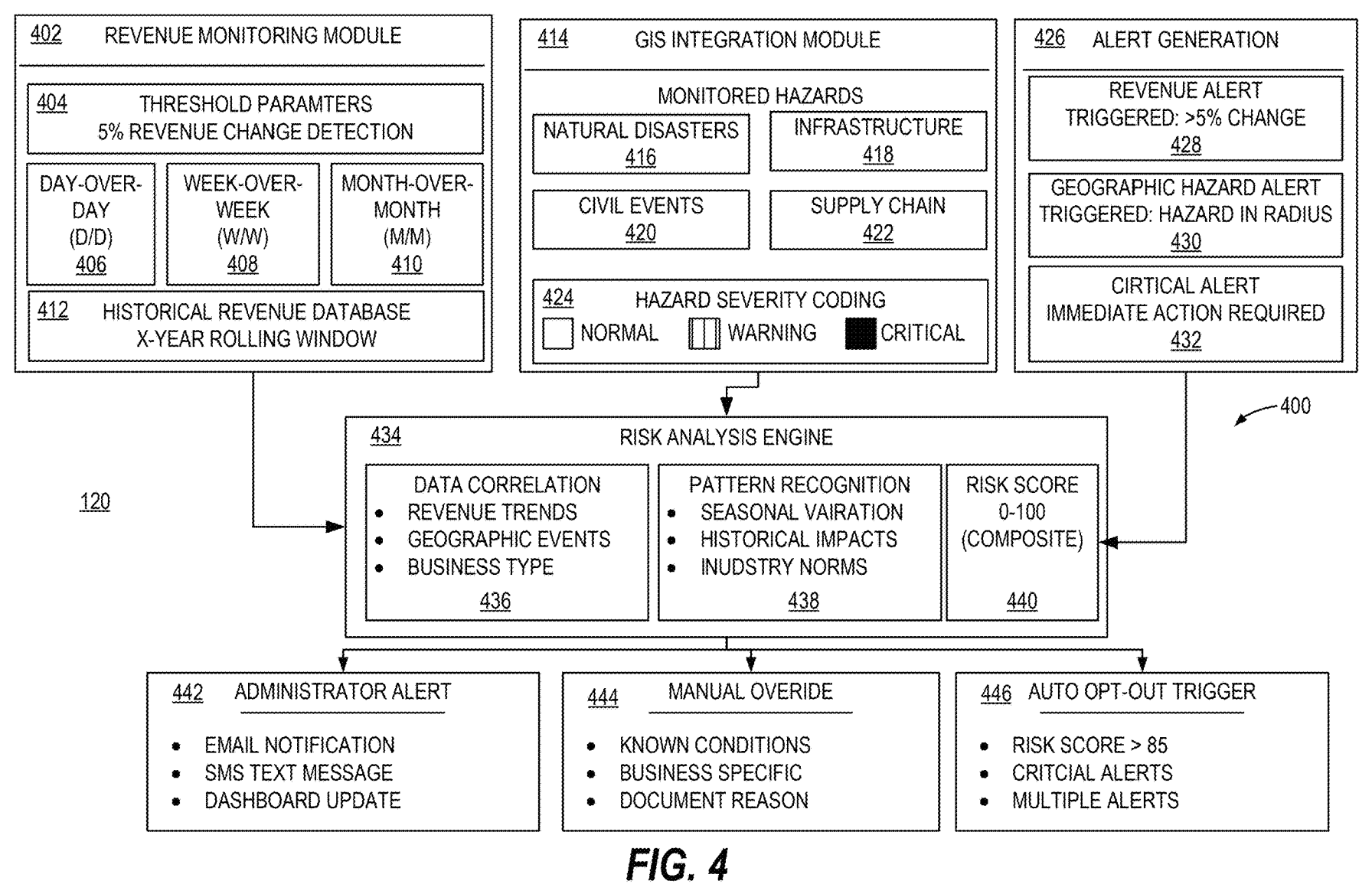

402  REVENUE MONITORING MODULE

404  THRESHOLD PARAMTERS
5% REVENUE CHANGE DETECTION

DAY-OVER-DAY (D/D) 406

WEEK-OVER-WEEK (W/W) 408

MONTH-OVER-MONTH (M/M) 410

412  HISTORICAL REVENUE DATABASE
X-YEAR ROLLING WINDOW

414  GIS INTEGRATION MODULE

MONITORED HAZARDS

NATURAL DISASTERS 416

INFRASTRUCTURE 418

CIVIL EVENTS 420

SUPPLY CHAIN 422

424  HAZARD SEVERITY CODING
☐ NORMAL   ▥ WARNING   ◼ CRITICAL

426  ALERT GENERATION

REVENUE ALERT
TRIGGERED: >5% CHANGE
428

GEOGRAPHIC HAZARD ALERT
TRIGGERED: HAZARD IN RADIUS
430

CRITICAL ALERT
IMMEDIATE ACTION REQUIRED
432

400

434  RISK ANALYSIS ENGINE

DATA CORRELATION
• REVENUE TRENDS
• GEOGRAPHIC EVENTS
• BUSINESS TYPE
436

PATTERN RECOGNITION
• SEASONAL VAIRATION
• HISTORICAL IMPACTS
• INUDSTRY NORMS
438

RISK SCORE
0-100
(COMPOSITE)
440

442  ADMINISTRATOR ALERT
• EMAIL NOTIFICATION
• SMS TEXT MESSAGE
• DASHBOARD UPDATE

444  MANUAL OVERRIDE
• KNOWN CONDITIONS
• BUSINESS SPECIFIC
• DOCUMENT REASON

446  AUTO OPT-OUT TRIGGER
• RISK SCORE > 85
• CRITCIAL ALERTS
• MULTIPLE ALERTS

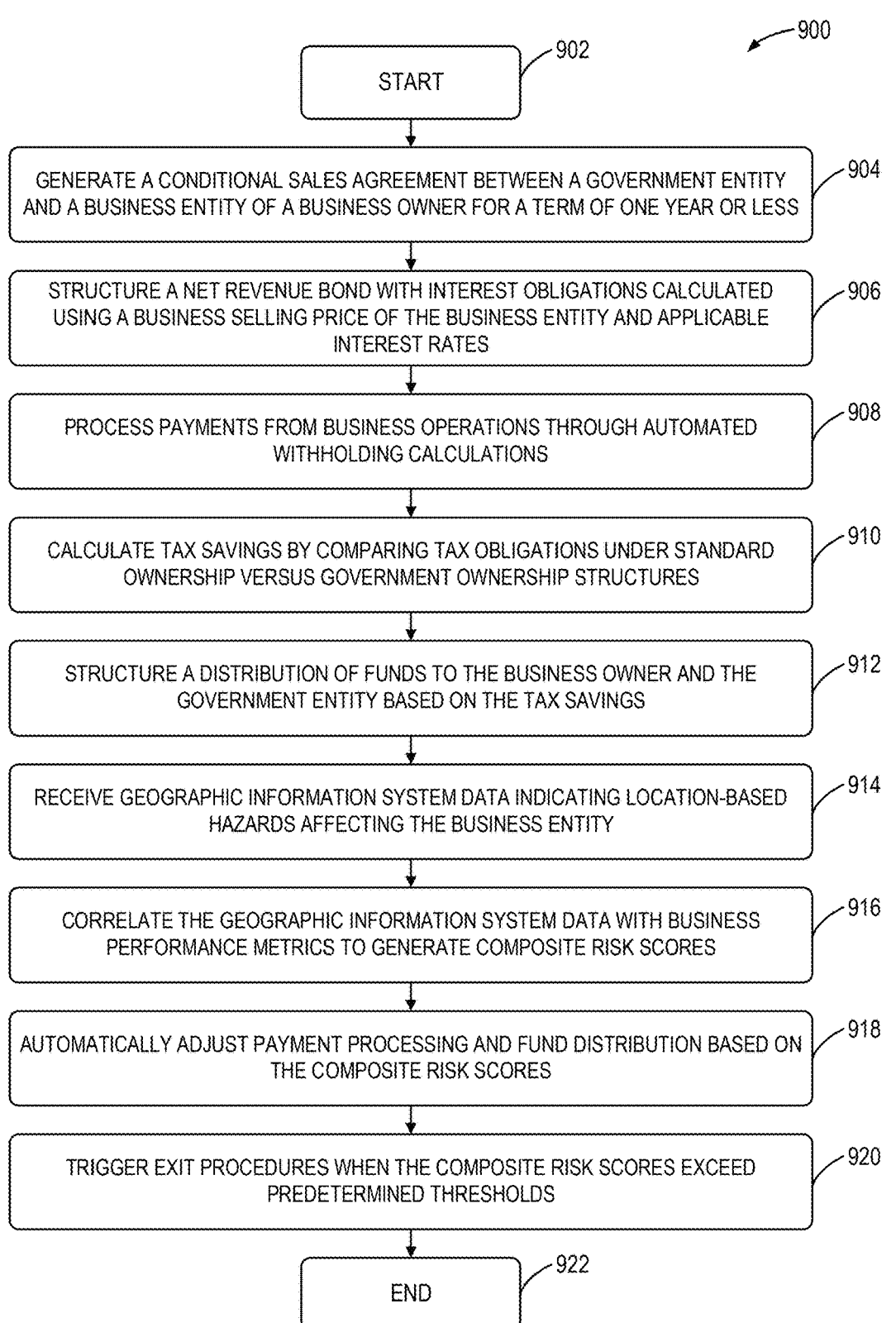

900

START ~902

GENERATE A CONDITIONAL SALES AGREEMENT BETWEEN A GOVERNMENT ENTITY AND A BUSINESS ENTITY OF A BUSINESS OWNER FOR A TERM OF ONE YEAR OR LESS ~904

STRUCTURE A NET REVENUE BOND WITH INTEREST OBLIGATIONS CALCULATED USING A BUSINESS SELLING PRICE OF THE BUSINESS ENTITY AND APPLICABLE INTEREST RATES ~906

PROCESS PAYMENTS FROM BUSINESS OPERATIONS THROUGH AUTOMATED WITHHOLDING CALCULATIONS ~908

CALCULATE TAX SAVINGS BY COMPARING TAX OBLIGATIONS UNDER STANDARD OWNERSHIP VERSUS GOVERNMENT OWNERSHIP STRUCTURES ~910

STRUCTURE A DISTRIBUTION OF FUNDS TO THE BUSINESS OWNER AND THE GOVERNMENT ENTITY BASED ON THE TAX SAVINGS ~912

RECEIVE GEOGRAPHIC INFORMATION SYSTEM DATA INDICATING LOCATION-BASED HAZARDS AFFECTING THE BUSINESS ENTITY ~914

CORRELATE THE GEOGRAPHIC INFORMATION SYSTEM DATA WITH BUSINESS PERFORMANCE METRICS TO GENERATE COMPOSITE RISK SCORES ~916

AUTOMATICALLY ADJUST PAYMENT PROCESSING AND FUND DISTRIBUTION BASED ON THE COMPOSITE RISK SCORES ~918

TRIGGER EXIT PROCEDURES WHEN THE COMPOSITE RISK SCORES EXCEED PREDETERMINED THRESHOLDS ~920

END ~922

*FIG. 9*

TAX-ADVANTAGED BUSINESS OWNERSHIP TRANSFER SYSTEM

CROSS-REFERENCE TO RELATED APPLICATIONS

This application claims the benefit of and priority to U.S. Provisional Patent Application No. 63/662,845, filed on Jun. 21, 2024, the entire contents of which are hereby incorporated by reference.

FIELD OF INVENTION

The present disclosure relates to tax management systems, and more particularly, but not exclusively, to a system for facilitating tax-advantaged business ownership transfers between private businesses and local government entities.

BACKGROUND

Tax management and optimization strategies have long been a focus for businesses seeking to maximize their financial efficiency. Traditionally, businesses have employed various methods to reduce their tax liabilities within the bounds of existing tax laws. These methods often involve complex financial structures, deductions, and credits that require careful navigation of tax regulations. Government entities, particularly at the local level, have continuously sought innovative ways to generate revenue and support their communities without increasing the tax burden on residents. Municipal bonds have been a common tool used by local governments to finance projects and operations. These bonds typically offer tax-free interest to investors, making them an attractive option for those seeking tax-advantaged investments. The relationship between businesses and local governments has historically been complex, with both entities often viewing their interests as separate or even at odds. However, there has been a growing recognition of the potential for mutually beneficial arrangements that can support both business growth and community development.

Financial technology has played an increasingly prominent role in facilitating new approaches to business operations and tax management. Advanced software systems have enabled more in depth analysis of financial data, real-time monitoring of business performance, and automated compliance with regulatory requirements. Risk management in business operations has become increasingly important, particularly in light of economic uncertainties and natural disasters. Businesses and government entities alike have sought ways to mitigate risks associated with revenue fluctuations, geographic hazards, and other factors that can impact financial stability. The intersection of business operations, government revenue generation, and tax optimization presents a complex landscape with potential for innovative solutions. As technology continues to advance and economic conditions evolve, there is an ongoing need for systems and methods that can effectively address these interconnected challenges.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a system for facilitating tax-advantaged business transactions is provided. The system includes a processor and a memory storing instructions that, when executed by the processor, cause the system to receive, from a business owner, business financial data. The system calculates a business selling price based on the business financial data and an industry-specific price-to-earnings ratio. The system generates a conditional sales agreement between a government entity and the business owner, wherein the agreement transfers ownership of the business to the government entity. The system processes payments from the business operations, calculates tax savings based on the processed payments, and distributes funds to the business owner and the government entity based on the calculated tax savings.

According to other aspects of the present disclosure, the system may include one or more of the following features. The system may monitor business operations for risk factors and alert the government entity if a risk factor exceeds a predetermined threshold. The risk factors may include at least one of: revenue decline, geographic hazards, or change in business ownership. The system may generate a qualified management agreement allowing the business owner to continue operating the business on behalf of the government entity. Calculating the tax savings may comprise determining a tax liability based on the processed payments and calculating the tax savings as a percentage of the determined tax liability. Distributing the funds may comprise allocating a first portion of the tax savings to the business owner, allocating a second portion of the tax savings to the government entity, and allocating a third portion of the tax savings to a program administrator. The first portion may be 50% of the tax savings, the second portion may be 37.5% of the tax savings, and the third portion may be 12.5% of the tax savings.

According to another aspect of the present disclosure, a method for managing tax-advantaged business transactions is provided. The method includes receiving, by a processor, business financial data from a business owner. The method calculates, by the processor, a business selling price based on the business financial data and an industry-specific price-to-earnings ratio. The method generates a conditional sales agreement between a government entity and the business owner, wherein the agreement transfers ownership of the business to the government entity. The method processes payments from the business operations, calculates tax savings based on the processed payments, and distributes funds to the business owner and the government entity based on the calculated tax savings.

According to other aspects of the present disclosure, the method may include one or more of the following features. The method may include monitoring business operations for risk factors and alerting the government entity if a risk factor exceeds a predetermined threshold. The risk factors may include at least one of: revenue decline, geographic hazards, or change in business ownership. The method may include generating a qualified management agreement allowing the business owner to continue operating the business on behalf of the government entity. Calculating the tax savings may comprise determining a tax liability based on the processed payments and calculating the tax savings as a percentage of the determined tax liability. Distributing the funds may comprise allocating a first portion of the tax savings to the business owner, allocating a second portion of the tax savings to the government entity, and allocating a third portion of the tax savings to a program administrator. The first portion may be 50% of the tax savings, the second portion may be 37.5% of the tax savings, and the third portion may be 12.5% of the tax savings.

According to another aspect of the present disclosure, a non-transitory computer-readable medium storing instructions is provided. When executed by a processor, the instructions cause the processor to perform operations comprising receiving business financial data from a business owner, calculating a business selling price based on the business financial data and an industry-specific price-to-earnings ratio, generating a conditional sales agreement between a government entity and the business owner, wherein the agreement transfers ownership of the business to the government entity, processing payments from the business operations, calculating tax savings based on the processed payments, and distributing funds to the business owner and the government entity based on the calculated tax savings.

According to other aspects of the present disclosure, the operations may include one or more of the following features. The operations may include monitoring business operations for risk factors and alerting the government entity if a risk factor exceeds a predetermined threshold. The risk factors may include at least one of: revenue decline, geographic hazards, or change in business ownership. The operations may include generating a qualified management agreement allowing the business owner to continue operating the business on behalf of the government entity. Calculating the tax savings may comprise determining a tax liability based on the processed payments and calculating the tax savings as a percentage of the determined tax liability. Distributing the funds may comprise allocating a first portion of the tax savings to the business owner, allocating a second portion of the tax savings to the government entity, and allocating a third portion of the tax savings to a program administrator.

According to other aspects of the present disclosure, a system for facilitating a tax-advantaged business transaction with automated risk mitigation is provided. The system comprises at least one processor and a memory storing instructions that, when executed by the at least one processor, cause the system to generate a conditional sales agreement between a government entity and a business entity of a business owner for a term of one year or less, structure a net revenue bond with interest obligations calculated using a business selling price of the business entity and applicable interest rates, process payments from business operations through automated withholding calculations, calculate tax savings, structure a distribution of funds to the business owner and the government entity based on the tax savings, receive geographic information system data indicating location-based hazards affecting the business entity, correlate the geographic information system data with business performance metrics to generate composite risk scores, automatically adjust payment processing and fund distribution based on the composite risk scores, and trigger exit procedures when the composite risk scores exceed predetermined thresholds.

In some aspects, the system is configured to calculate the business selling price by multiplying net revenue by an industry-specific price-to-earnings ratio obtained from an industry data service, generate the net revenue bond as an unregistered municipal bond with a term of less than one year, and structure interest payments to the business owner as tax-free municipal bond income.

In some aspects, calculating the business selling price further comprises retrieving historical price-to-earnings ratios for a business industry classification of the business entity, adjusting the ratio based on business-specific factors including revenue stability and growth trends, and generating a valuation report including a calculation methodology and data sources.

In some aspects, the system is configured to generate a qualified management agreement that maintains operational control with the business owner while satisfying IRS Revenue Procedure requirements for qualified management contracts, retain business licenses and permits in a name of the business owner throughout term, and maintain unchanged daily operations except for payment processing modifications.

In some aspects, distributing funds comprises calculating daily withholding amounts by applying predetermined tax rates to each transaction, accumulating withheld funds in an escrow account, performing monthly reconciliation of accumulated funds, and distributing funds according to predetermined ratios: 50% to the business owner as tax-free municipal bond interest, 37.5% to the government entity as business profit, and 12.5% to a program administrator as management fees.

In some aspects, the monthly reconciliation further comprises comparing payment processor reports with escrow account deposits, identifying and resolving discrepancies through automated exception handling, generating reconciliation reports with variance analyses, and adjusting subsequent distributions based on reconciliation results.

In some aspects, the system is configured to implement blockchain-based smart contracts that automatically execute terms of the conditional sales agreement, record all transactions on an immutable distributed ledger while maintaining reversibility through the perpetual default condition, utilize smart contract oracles to integrate real-time geographic information system data and payment information, and enforce automated compliance through smart contract logic that prevents unauthorized transactions.

In some aspects, the blockchain-based smart contracts comprise a securing smart contract managing authentication and access control for all participants, a sale smart contract automating the transfer of business assets with perpetual default logic, a management smart contract enforcing operational agreements and payment distributions, and a risk monitoring smart contract that automatically triggers responses based on geographic information system data inputs.

In some aspects, the system is configured to generate a visual dashboard displaying real-time metrics including current tax savings calculations for each participating business, geographic risk indicators overlaid on a map interface, payment flow visualizations showing fund distributions, alert notifications for risk threshold breaches, and update the visual dashboard in real-time as new geographic information system data and payment information is received.

In some aspects, the visual dashboard further comprises interactive controls allowing users to adjust risk threshold parameters, drill-down capabilities to examine individual business performance metrics, predictive analytics displaying projected risk scenarios based on geographic information system data trends, and exportable reports for regulatory compliance documentation.

In some aspects, distributing funds to the business owner and the government entity based on the tax savings comprises generating a distribution schedule that allocates specific percentages of the tax savings to each party, calculating an exact amount due to each party based on the distribution schedule and a total tax savings for a current period of time, verifying that the distribution of funds maintains the perpetual default condition by ensuring that allocated funds do not fully satisfy obligations of the net revenue bond, initiating separate electronic fund transfers to accounts designated by the business owner and the government entity, generating detailed distribution reports documenting an allocation methodology, tax savings calculations, and actual amounts transferred, maintaining an audit trail of all fund distributions for compliance and transparency purposes, and automatically adjusting future distributions based on any changes in tax regulations or agreement terms while preserving the tax-advantaged business transaction.

In some aspects, the system further comprises a revenue monitoring module configured to detect percentage changes across day-over-day, week-over-week, and month-over-month periods, wherein the revenue monitoring module interfaces with the geographic information system data to identify revenue impacts from geographic events.

In some aspects, the blockchain-based smart contracts further comprise gas optimization algorithms minimizing transaction costs during high-volume distribution periods, cross-chain bridges enabling integration with multiple blockchain networks, and zero-knowledge proofs protecting sensitive business financial data while maintaining transparency.

In some aspects, generating the visual dashboard further comprises WebSocket connections providing sub-second latency for critical alerts, progressive web app architecture enabling offline dashboard access during network disruptions, and encrypted data channels protecting sensitive financial information during display rendering.

According to an aspect of the present disclosure, a method for managing a tax-advantaged business transaction with integrated risk mitigation is provided. The method comprises receiving business financial data including revenue streams and tax obligations, generating a conditional sales agreement with perpetual default structure that prevents asset transfer completion while enabling ownership benefits, processing daily payment transactions with automated tax withholding through integrated payment channels, calculating tax savings based on differential tax treatment between private and government ownership, distributing funds to a business owner and a government entity based on the tax savings according to predetermined allocation ratios, receiving geographic information system data from multiple hazard monitoring sources, analyzing the geographic information system data to identify location-based risks including natural disasters, infrastructure disruptions, and civil events within proximity to business operations, correlating the location-based risks with business revenue patterns to assess operational impact, automatically modifying fund distribution parameters when location-based risks exceed threshold levels, and executing automated exit procedures leveraging the perpetual default structure when composite risk assessments indicate critical conditions.

In some aspects, the method further comprises maintaining a historical revenue database with multi-year transaction records, performing statistical analysis to establish dynamic performance baselines, detecting anomalies through pattern recognition algorithms, and generating predictive risk assessments based on correlation analysis between GIS events and revenue impacts.

In some aspects, the pattern recognition algorithms comprise machine learning models trained on historical disaster impact data, neural networks identifying subtle correlations between geographic events and business performance, ensemble methods combining multiple prediction models for improved accuracy, and continuous model refinement based on actual outcome data.

In some aspects, distributing funds based on the tax savings comprises implementing smart contract logic that automatically calculates distribution amounts, executing blockchain transactions to transfer funds according to the predetermined allocation ratios, maintaining cryptographic proof of all distributions on a distributed ledger, and generating tax documentation through smart contract execution.

In some aspects, the smart contract logic further comprises condition precedents that verify GIS risk levels before authorizing distributions, automated escrow mechanisms that hold funds during risk assessment periods, multi-signature requirements for distributions exceeding threshold amounts, and automatic reversion protocols if risk conditions deteriorate.

In some aspects, distributing funds to the business owner and the government entity based on the tax savings comprises determining a total distributable amount based on the tax savings for a specified period, applying predetermined allocation ratios to the total distributable amount to calculate specific fund amounts for the business owner and the government entity, verifying that sufficient funds are available in a designated escrow account to cover the specific fund amounts, initiating separate electronic fund transfers to accounts specified by the business owner and the government entity, generating detailed distribution reports itemizing the tax savings, allocation ratios applied, and exact amounts transferred to each party, recording each distribution transaction in a secure, auditable ledger for compliance and transparency purposes, and automatically adjusting future distributions based on any changes in tax regulations, agreement terms, or risk assessments while maintaining the tax-advantaged business transaction.

In some aspects, distributing funds based on the tax savings further comprises integrating with multiple payment processing systems to accommodate various revenue sources, implementing automated reconciliation processes to ensure accuracy of tax savings calculations across all revenue streams, applying dynamic withholding rates that adjust based on seasonal business fluctuations and projected tax obligations, providing options for frequency of distributions, including monthly, quarterly, or custom schedules based on business needs and government entity preferences, establishing contingency reserves from a portion of calculated tax savings to mitigate potential future risks or tax liabilities, and facilitating reinvestment options that allow participants to allocate a percentage of distributions towards business improvements or community development projects.

According to an aspect of the present disclosure, a non-transitory computer-readable medium storing instructions that, when executed by at least one processor, causes the at least one processor to perform operations is provided. The operations comprise establishing a one-year conditional sales structure with a perpetual default condition that prevent irreversible asset transfers, processing payment streams through automated withholding and distribution calculations, calculating tax savings through comparison of tax obligations under different ownership structures, distributing funds to business owners and government entities based on the tax savings while maintaining operational control with original owners, integrating with geographic information system (GIS) services to receive real-time hazard data, performing multi-factor risk analysis by correlating GIS hazard data with business performance indicators, implementing graduated risk responses, maintaining flexible exit options through the perpetual default condition without requiring completed asset transfers, and generating audit trails documenting risk-based decisions and automated responses for regulatory compliance.

In some aspects, the operations further comprise displaying on a dashboard interface real-time GIS hazard maps with business location overlays, dynamic risk scores with trend indicators, fund distribution status with recipient breakdowns, automated alert banners for critical conditions, enabling user interaction with the dashboard interface to modify monitoring parameters, and streaming updates to the dashboard interface as new data is received from geographic information system services and payment processors.

In some aspects, the dashboard interface further comprises augmented reality visualizations showing potential hazard impacts on business locations, comparative analytics displaying performance across multiple businesses in hazard zones, simulation capabilities for testing different risk scenarios, and mobile-responsive design enabling field monitoring during emergency conditions.

In some aspects, the operations further comprise deploying smart contracts on a permissioned blockchain network, encoding the perpetual default condition within smart contract state machines, integrating oracle services to feed GIS data into smart contract execution, and triggering automated smart contract responses based on composite risk calculations.

In some aspects, responses of the smart contracts comprise automatic fund redistribution when GIS hazards are detected, temporary suspension of payment processing during critical events, immediate execution of exit procedures through smart contract state transitions, and generation of immutable audit logs documenting all automated decisions.

In some aspects, distributing funds to the business owners and the government entities based on the tax savings comprises determining a total distributable amount by aggregating tax savings across all participating businesses for a specified period, applying predetermined allocation ratios to the total distributable amount to calculate specific fund amounts for each business owner and associated government entity, verifying that the distribution calculations maintain the perpetual default condition by ensuring they do not fully satisfy outstanding obligations, initiating separate electronic fund transfers to designated accounts for each business owner and government entity, generating detailed distribution reports for each transaction, recording each distribution transaction in a tamper-resistant ledger for audit purposes, implementing adaptive distribution algorithms, providing real-time distribution tracking through secure online portals accessible to business owners and government entities, enabling authorized parties to model different distribution scenarios through interactive forecasting tools, automatically adjusting future distributions based on various factors, and generating comparative analytics showing distributed amounts versus traditional tax obligations to quantify program benefits for all parties.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

FIG. 4 illustrates a block diagram of a risk management system, according to aspects of the present disclosure.

FIG. 9 illustrates a flowchart of a method for managing tax-advantaged business transactions, according to aspects of the present disclosure.

DETAILED DESCRIPTION

Figure 1:
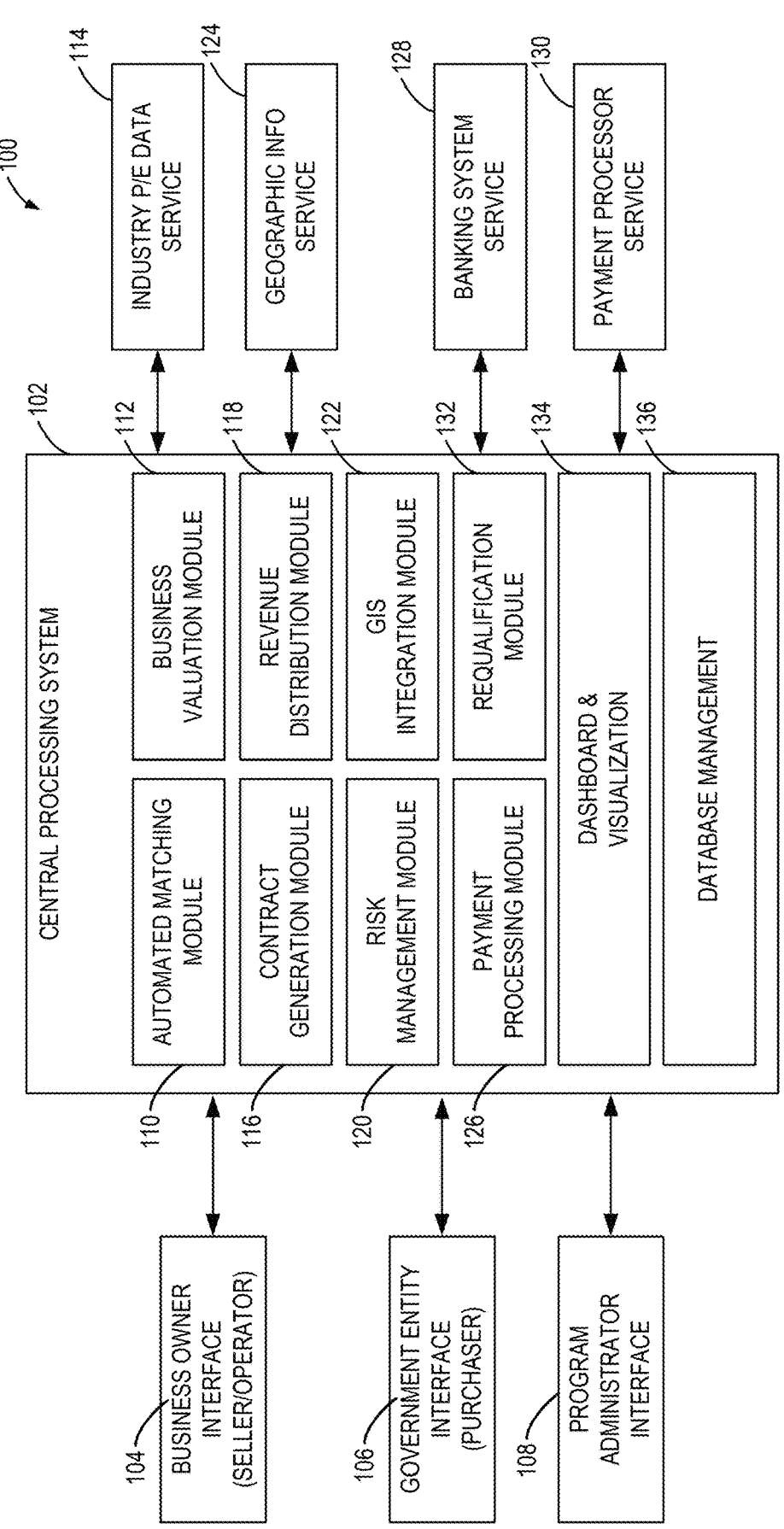
FIG. 1 illustrates a block diagram of a tax management system, according to aspects of the present disclosure.

The following description sets forth exemplary aspects of the present disclosure. It should be recognized, however, that such description is not intended as a limitation on the scope of the present disclosure. Rather, the description also encompasses combinations and modifications to those exemplary aspects described herein.

Aspects of the present disclosure provide apparatuses, methods, processing systems, and computer-readable mediums for facilitating tax-advantaged business transactions through automated risk management and flexible ownership structures.

Modern financial transaction systems face significant challenges in striking a balance between transaction finality and operational flexibility. Traditional ownership transfers involving government entities and businesses often suffer from rigid structures that make it challenging to adapt to changing circumstances once transactions are initiated. When a business is sold to a government entity, the transfer may become irreversible. An irreversible transaction may create risks for both parties if business conditions deteriorate or external factors impact operations. Additionally, current systems lack the ability to correlate real-world hazards with financial operations in real time. This may end up leaving parties vulnerable to unforeseen events such as natural disasters, infrastructure failures, or economic disruptions. The present disclosure addresses these challenges by introducing a structure that maintains ownership flexibility while enabling tax-advantaged benefits through automated monitoring and response systems.

Existing financial transaction systems encounter multiple technical challenges when attempting to facilitate government-business ownership transfers. Conventional blockchain and distributed ledger systems guarantee transaction finality, meaning that once a transaction is executed, it cannot be reversed or modified. This lack of flexibility can pose significant risks when external conditions change. For example, parties involved in an agreement may find it challenging to exit without complex unwinding procedures.

Furthermore, current financial systems often operate independently of real-world monitoring systems, which means they fail to consider geographic hazards, infrastructure conditions, or environmental factors in their transaction management. The inability to correlate payment processing data with location-based risk information can lead to delayed responses to critical events, potentially resulting in substantial financial losses.

Additionally, ensuring operational continuity during ownership transfers presents technical challenges, as license transfers, system migrations, and operational handovers can frequently disrupt business processes.

Aspects of the disclosed system are directed to a technical solution through a perpetual default mechanism that prevents irreversible asset transfers while enabling ownership benefits. By structuring transactions with interest obligations that exceed available business profits, the aspects described herein can maintain a technical state where ownership transfers remain incomplete, allowing either party to exit without unwinding complex asset transfers. In some aspects, a system may further integrate geographic information system (GIS) data feeds with payment processing streams, creating real-time correlation between location-based hazards and business performance metrics. This integration enables automated responses to changing conditions, including dynamic adjustment of payment distributions and automatic triggering of exit procedures when risk thresholds are exceeded. In some aspects, a smart contract implementation on blockchain infrastructure may provide an immutable audit trail. Further, the perpetual default mechanism maintains transaction reversibility thereby resolving the technical contradiction between blockchain finality and operational flexibility.

The technical solutions provided by the disclosed system may provide improvements in transaction processing efficiency and risk management. A perpetual default mechanism may reduce or eliminate the need for complex contract unwinding procedures which can reduce transaction reversal time. Real-time GIS integration allows the system to identify and respond to hazards, which helps to minimize financial losses during crisis events. Additionally, implementing smart contracts can automate compliance verification and fund distribution, thereby eliminating delays associated with manual processing and reducing transaction costs.

The present disclosure relates to a tax-advantaged business ownership transfer system. The system facilitates transactions between business owners and government entities to provide tax benefits while maintaining operational control of businesses. In some cases, the system includes a central processing unit and computer-readable memory storing instructions. When executed by the central processing unit, the instructions cause the system to perform various operations related to business valuation, contract generation, payment processing, and fund distribution.

The system may involve multiple participants, including business owners, government entities, and a program administrator. Business owners provide financial data and enter into agreements with government entities. Government entities acquire conditional ownership of businesses and issue revenue bonds. The program administrator oversees the system operations and facilitates transactions between parties. In some implementations, the system processes payments from business operations, calculates tax savings, and distributes funds to participants based on predetermined allocation ratios. The system may also incorporate risk management features to monitor business performance and alert participants to potential issues.

The system may be implemented as a non-transitory computer-readable medium storing instructions. When executed by a processor, these instructions perform operations related to managing tax-advantaged business transactions, including receiving business data, calculating selling prices, generating agreements, and distributing funds.

In some implementations, a tax management system 100 may facilitate tax-advantaged business transactions between business owners and government entities through temporary ownership transfers. FIG. 1 illustrates an example configuration of the tax management system 100 that may enable businesses to achieve significant tax savings while providing revenue streams to local government entities.

The tax management system 100 may include a central processing system 102 that serves as a computational and coordination hub for all system operations. In some aspects, the central processing system 102 may comprise one or more servers, cloud-based computing resources, or distributed computing architectures capable of processing multiple simultaneous transactions and managing financial calculations. The central processing system 102 may incorporate various security protocols, including encryption, multi-factor authentication, and Secure Sockets Layer (SSL) communications, to protect sensitive financial and business data. In certain implementations, the central processing system 102 may utilize load-balancing techniques to distribute processing tasks across multiple servers. The central processing system 102 may also include redundant data storage and backup systems to maintain data integrity and enable disaster recovery capabilities. In some examples, the central processing system 102 may be configured to handle peak loads during end-of-year tax processing periods, automatically scaling computational resources as needed to maintain system performance.

The central processing system 102 can connect to multiple user interfaces, allowing various stakeholders to engage with the tax management system 100. The business owner interface 104 grants business owners access to features of the system that are relevant to their involvement in the tax optimization program. In some implementations, the business owner interface 104 may include a web-based portal accessible through standard internet browsers, mobile applications for iOS and Android devices, and application programming interfaces (APIs) for integration with existing business management systems. The business owner interface 104 may enable business owners to input financial data, upload tax returns and financial statements, view transaction histories, monitor tax savings in real-time, and communicate with government entities and program administrators. The business owner interface 104 may include data validation routines to ensure the accuracy of submitted financial information. It may also provide guided workflows to assist business owners through the application and qualification process.

A government entity interface 106 may be provided to enable local government entities to participate in and manage their involvement in the tax management system 100. In some examples, the government entity interface 106 may allow government officials to specify their investment criteria, review matched businesses, approve or reject proposed transactions, monitor revenue streams from acquired businesses, and generate reports for public disclosure and accountability purposes. The government entity interface 106 may include role-based access controls to ensure that authorized government personnel can access sensitive business information and approve transactions. In certain implementations, the government entity interface 106 may integrate with existing government financial management systems to streamline accounting and reporting processes.

A program administrator interface 108 may facilitate system administration and oversight functions. In some aspects, the program administrator interface 108 may provide comprehensive system monitoring capabilities, user management tools, compliance tracking features, and advanced analytics dashboards. Program administrators may use this interface to configure system parameters, establish matching criteria between businesses and government entities, monitor system-wide performance metrics, generate regulatory compliance reports, and provide technical support to users. The program administrator interface 108 may include audit trail functionality to maintain detailed logs of all administrative actions for accountability and regulatory compliance purposes.

In some implementations, the central processing system 102 may include an automated matching module 110 that facilitates the pairing of compatible businesses with appropriate government entities. The automated matching module 110 may utilize algorithms to analyze multiple compatibility factors, including geographic proximity, business size, and type, government entity investment criteria, risk profiles, and potential tax savings. In certain aspects, the automated matching module 110 may utilize machine learning techniques to enhance matching accuracy over time based on historical transaction success rates and user feedback. The module may consider factors such as the government entity's prohibited industry codes, minimum revenue requirements, geographic restrictions, and available funding capacity when identifying potential matches. In some examples, the automated matching module 110 generates compatibility scores for each potential business-government pairing and prioritizes matches based on these scores to maximize the likelihood of successful transactions.

A business valuation module 112 may be incorporated within the central processing system 102 to determine appropriate purchase prices for businesses entering the program. In some implementations, the business valuation module 112 may receive comprehensive financial data from business owners through the business owner interface 104, including profit and loss statements, tax returns, cash flow statements, and balance sheets for multiple years. The business valuation module 112 may interface with an industry data service 114 to obtain current industry-specific price-to-earnings (P/E) ratios and other relevant valuation metrics. In certain aspects, the business valuation module 112 may apply valuation methodologies that account for industry-specific factors, business size, growth trends, seasonal variations, and market conditions. The business valuation module 112 may calculate business selling prices by multiplying net revenue by the relevant industry price-to-earnings (P/E) ratio. The business valuation module 112 may take into account adjustments for specific factors such as customer concentration, competitive positioning, and operational efficiency. Additionally, the business valuation module 112 may generate detailed valuation reports that document the methodology and data sources used to determine the business selling price. This provides transparency and supports due diligence requirements.

The central processing system 102 may include a contract generation module 116 that automates the creation of legal agreements between participating parties. In some implementations, the contract generation module 116 may generate conditional sales agreements that temporarily transfer business ownership to government entities while maintaining operational control with the original business owners.

The contract generation module 116 may utilize pre-approved legal templates that comply with federal tax regulations and state-specific requirements for municipal business acquisitions. In certain aspects, the module may dynamically populate contract terms based on the specific characteristics of each transaction, including the calculated business selling price, payment terms, interest rates, management agreement provisions, and exit conditions. The contract generation module 116 may incorporate provisions for automatic reversion of ownership after the one-year term, opt-out clauses for both parties and specific performance requirements to maintain tax-advantaged status. In some examples, the contract generation module 116 may interface with electronic signature services to facilitate remote execution of contracts. The contract generation module 116 may maintain secure repositories of all executed agreements with appropriate access controls.

A revenue distribution module 118 may be integrated into the central processing system 102 to manage the complex financial flows resulting from the tax optimization structure. In some aspects, the revenue distribution module 118 may process daily payment data from business operations, calculate applicable tax liabilities under both standard and program scenarios, and determine the resulting tax savings. The module may then distribute funds according to predefined allocation formulas, for example, providing 50% of tax savings to the business owner as tax-free municipal bond interest, 37.5% to the government entity as revenue, and 12.5% to the program administrator as management fees. In certain implementations, the revenue distribution module 118 may interface with payment processing systems to capture transaction data in real time, apply withholding calculations to each transaction, and maintain detailed accounting records for all fund movements. The revenue distribution module 118 may generate monthly distribution reports, handle multi-party settlement processes, and ensure compliance with federal regulations regarding municipal bond interest payments. In some examples, the revenue distribution module 118 may incorporate safeguards to prevent over-distribution of funds and may maintain reserve accounts to handle potential chargebacks or payment disputes.

The central processing system 102 may incorporate a risk management module 120 designed to monitor and mitigate various risks associated with the business ownership transfers. In some implementations, the risk management module 120 may continuously analyze business performance metrics to identify potential issues that could impact the government entity's investment or the program's tax-advantaged status. The risk management module 120 may monitor key performance indicators, including daily, weekly, and monthly revenue trends, year-over-year comparisons, industry-specific benchmarks, and deviation thresholds. In certain aspects, and as one example, the risk management module 120 may generate automated alerts when business revenues decline by more than 5% on a day-over-day, week-over-week, or month-over-month basis, enabling proactive intervention before issues become critical. The module may also track non-financial risk factors such as changes in business ownership or management, regulatory compliance issues, and reputational concerns. In some examples, the risk management module 120 may interface with credit reporting agencies, business intelligence databases, and public records systems to maintain comprehensive risk profiles for each participating business.

A GIS integration module 122 may be connected to the risk management module 120 to provide geographic and environmental risk assessment capabilities. In some aspects, the GIS integration module 122 may interface with a geographic information service 124 to obtain real-time data about natural disasters, weather events, civil disturbances, and other location-based risks that could impact business operations. The GIS integration module 122 may maintain geocoded locations for all participating businesses and government entities, enabling rapid assessment of exposure to geographic hazards. In certain implementations, the GIS integration module 122 may incorporate predictive analytics to forecast potential impacts of approaching weather systems, track the spread of natural disasters, and estimate recovery timeframes for affected areas. The GIS integration module 122 may generate visual heat maps showing risk concentrations across geographic regions and may trigger automatic notifications to stakeholders when businesses fall within defined hazard zones. In some examples, the GIS integration module 122 may differentiate between business types when assessing geographic risks, recognizing that certain businesses may benefit from disaster conditions while others suffer losses.

A payment processing module 126 may be included in the central processing system 102 to handle the complex payment flows required by the tax optimization structure. In some implementations, the payment processing module 126 may interface with both a banking system service 128 and a payment processor service 130 to facilitate electronic funds transfers, ACH transactions, and credit card processing. The payment processing module 126 may establish merchant accounts on behalf of government entities, configure payment routing rules to direct funds to appropriate escrow accounts, and manage the timing of fund distributions to comply with municipal bond regulations. In certain aspects, the payment processing module 126 may incorporate reconciliation capabilities to match payment processor reports with bank statements to ensure an accurate accounting of transactions. The payment processing module 126 may support multiple payment channels, including point-of-sale systems, e-commerce platforms, and mobile payment solutions, aggregating transaction data from all sources for comprehensive revenue tracking. In some examples, the payment processing module 126 may implement fraud detection algorithms, chargeback management processes, and PCI compliance protocols to protect the financial integrity of the system.

The central processing system 102 may include a requalification module 132 that manages the annual renewal process for participating businesses. In some aspects, the requalification module 132 may initiate requalification procedures at appropriate intervals, typically beginning in the tenth or eleventh month of each contract term, to ensure continuity of tax benefits. The requalification module 132 may automatically retrieve updated financial information from integrated accounting systems or prompt business owners to submit current financial statements through the business owner interface 104. In certain implementations, the requalification module 132 may recalculate business valuations using current P/E ratios and updated financial performance data, adjust payment terms in response to changes in interest rates or tax regulations, and generate new contracts reflecting the revised terms. The requalification module 132 may incorporate business rules to automatically disqualify businesses that no longer meet minimum revenue thresholds or have experienced significant operational changes. In some examples, the requalification module 132 may provide comparative analytics showing year-over-year changes in business performance and tax savings, enabling informed decisions about continued program participation.

A dashboard and visualization module 134 may be incorporated into the central processing system 102 to provide intuitive visual representations of system data and performance metrics. In some implementations, the dashboard and visualization module 134 may generate customized dashboards for each user type, presenting relevant information in easily digestible formats such as charts, graphs, heat maps, and trend lines. For business owners, the dashboard and visualization module 134 may display real-time tax savings, payment histories, and performance comparisons against program thresholds. Government entities may view aggregate revenue streams, portfolio performance metrics, and risk indicators across their business acquisitions. In certain aspects, the dashboard and visualization module 134 may incorporate interactive features that allow users to drill down into specific data points, adjust analysis periods, and export reports in various formats. The dashboard and visualization module 134 may utilize data visualization best practices to ensure accessibility and clarity, including color-coding for risk levels, responsive design for mobile devices, and customizable alert thresholds. In some examples, the dashboard and visualization module 134 may integrate with business intelligence tools to enable advanced analytics and predictive modeling capabilities.

The central processing system 102 may incorporate a database management module 136 responsible for organizing, storing, and retrieving the vast amounts of data generated by the tax management system 100. In some aspects, the database management module 136 may implement a multi-database architecture separating business data, government entity data, transaction records, and system configuration information into distinct but interconnected repositories. The database management module 136 may utilize relational database management systems for structured data, such as financial records and contracts, while employing NoSQL databases for unstructured data, like documents and communications. In certain implementations, the database management module 136 may incorporate data encryption at rest and in transit, implement role-based access controls to protect sensitive information, and/or maintain detailed audit logs of all database operations. The database management module 136 may perform regular database optimization tasks, including index management, query optimization, and data archival to maintain system performance as data volumes grow. In some examples, the database management module 136 may implement real-time replication across geographically distributed data centers to ensure high availability and disaster recovery capabilities.

In some implementations, the various modules within the central processing system 102 may operate in an integrated manner to facilitate one or more tax-advantaged business transactions. The workflow may begin when a business owner submits application materials through the business owner interface 104, triggering the business valuation module 112 to calculate an appropriate selling price. The automated matching module 110 may then identify compatible government entities based on the business profile and valuation. Upon successful matching, the contract generation module 116 may create the legal agreements, while the payment processing module 126 establishes the financial infrastructure. Throughout the contract term, the risk management module 120 and GIS integration module 122 may monitor for potential issues, while the revenue distribution module 118 ensures proper allocation of tax savings. The dashboard and visualization module 134 may provide ongoing visibility into system operations for all stakeholders, while the database management module 136 maintains the underlying data infrastructure. As contract terms approach expiration, the requalification module 132 may initiate renewal processes to maintain continuity of benefits.

Figure 2:
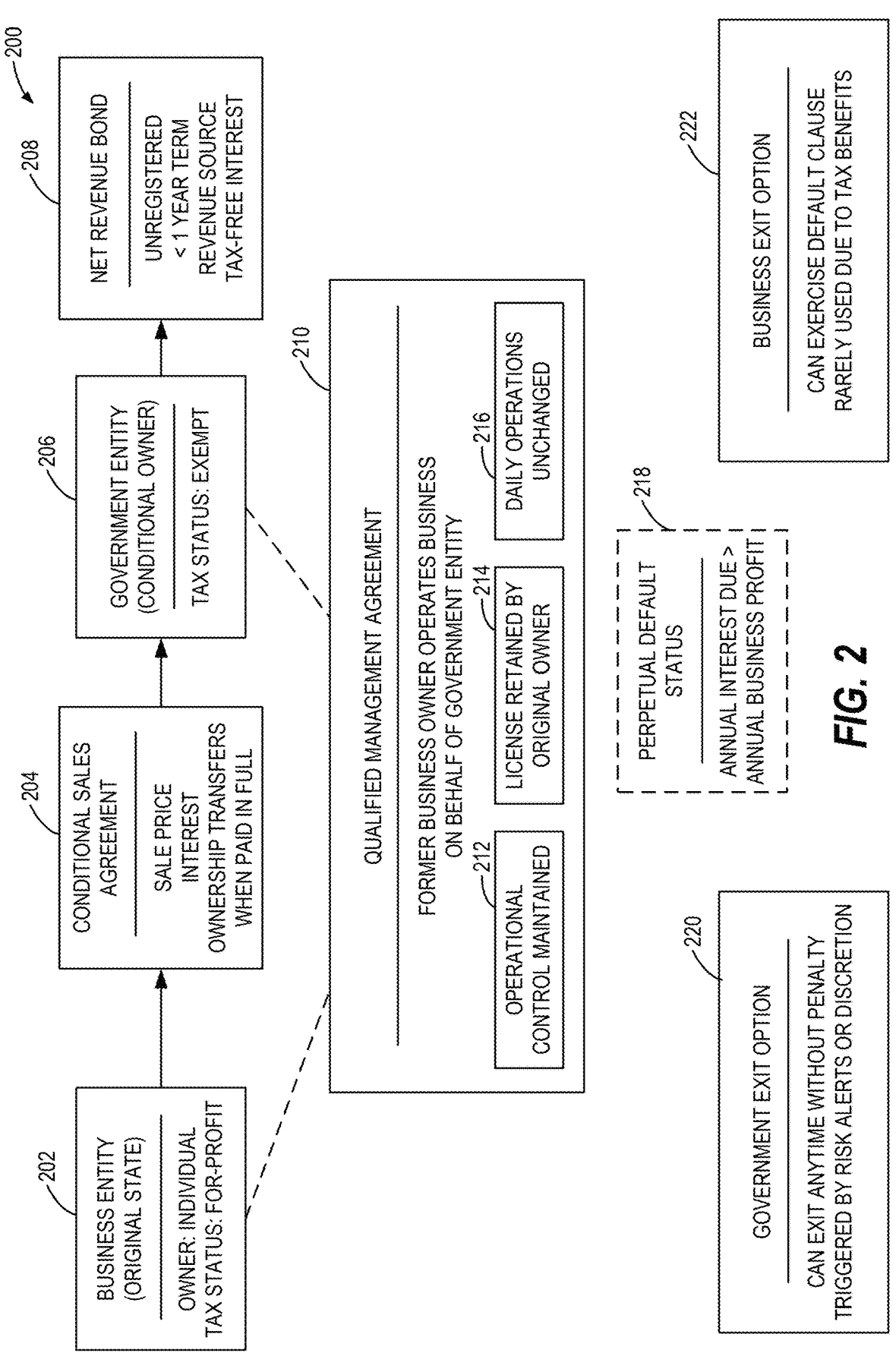
FIG. 2 illustrates a block diagram of a tax-advantaged business transaction system, according to aspects of the present disclosure.

In some implementations, the tax management system 100 may facilitate a transaction structure 200, as illustrated in FIG. 2. The transaction structure 200 may represent a framework for establishing temporary ownership transfers between business entities and government entities while maintaining operational continuity and achieving significant tax advantages for all parties involved.

A business entity 202 may serve as the originating party in the transaction structure 200. In some aspects, the business entity 202 may comprise any for-profit enterprise operating within the United States, including but not limited to corporations, limited liability companies, partnerships, or sole proprietorships. The business entity 202 may possess specific characteristics that qualify it for participation in the tax optimization program, such as maintaining profitable operations for a minimum period (typically three years), demonstrating stable or growing revenue patterns, and operating in industries not prohibited by the government entity's investment criteria. In certain implementations, the business entity 202 may retain its original tax identification number, business licenses, and operational permits throughout the transaction period. The business entity 202 may maintain its existing banking relationships, vendor contracts, and customer agreements, with modifications to accommodate the payment processing requirements of the tax management system. In some examples, business entity 202 may include businesses with annual profits ranging from small enterprises generating $100,000 in net income to larger operations with millions in annual profits, each benefiting proportionally from the tax savings structure.

The conditional sales agreement 204 may form the a legal instrument facilitating the temporary transfer of ownership from the business entity 202 to the government entity 206. In some implementations, the conditional sales agreement 204 may be structured as a specialized form of purchase agreement that includes specific conditions precedent and subsequent that differentiate it from traditional business acquisitions. The agreement may set a purchase price using industry-standard valuation methods, which usually involve applying sector-specific price-to-earnings ratios to the business's net annual revenue. Additionally, the conditional sales agreement may include specific provisions that delay the actual transfer of assets until full payment is received. This approach helps to maintain the existing licenses and permits of the business entity in the original owner's name for the duration of the transaction. The agreement may include detailed terms regarding the calculation of the sale price, the payment schedule based on the prime rate plus a premium for a zero-down payment, and specific performance obligations for both parties. In some examples, the conditional sales agreement 204 may contain automatic reversion clauses that return ownership to the original owner after the one-year term, exit provisions allowing either party to terminate the arrangement under specified conditions, and default remedies that protect both parties' interests while maintaining the tax-advantaged structure of the transaction.

A government entity 206 may serve as the purchaser in the transaction structure 200. In some aspects, government entity 206 may comprise any local government organization with statutory authority to acquire and operate for-profit business enterprises, including cities, counties, townships, or special districts operating under home rule charters. The government entity 206 may participate in the program to generate non-taxed revenue streams for public services without imposing additional tax burdens on citizens. In certain implementations, government entity 206 may establish specific investment criteria, including minimum revenue thresholds for target businesses, prohibited industry classifications, geographic limitations, and risk tolerance parameters. The government entity 206 may designate authorized officials to approve transactions, monitor performance, and make decisions regarding contract renewals or exits. In some examples, government entity 206 may utilize the revenue generated from business acquisitions to fund essential services such as infrastructure improvements, public safety enhancements, educational programs, or debt reduction, thereby improving community welfare without raising taxes.

The net revenue bond 208 may provide the financing mechanism for the government entity 206 to acquire the business entity 202. In some implementations, the net revenue bond 208 may be structured as an unregistered municipal bond with a term of less than one year, qualifying for exemption from SEC registration requirements while maintaining tax-exempt status for interest payments. The bond may be tied explicitly to revenues generated by the acquired business, with debt service obligations payable from business profits after all operational expenses are satisfied. In certain aspects, the net revenue bond 208 may carry an interest rate based on prevailing prime rates plus a risk premium which may offset or otherwise account for a zero-down-payment structure of the acquisition. The net revenue bond 208 may be designed to generate interest obligations that exceed the business's capacity to pay, creating a perpetual default condition that serves specific purposes within the transaction structure. The net revenue bond 208 may include provisions specifying that bondholders (the former business owners) can look to business revenues for payment, with no recourse to general government funds or assets. In some examples, the net revenue bond 208 may generate annual interest obligations calculated to maximize tax benefits while ensuring sustainable cash flows. Interest payments to former owners are treated as tax-free municipal-bond income, potentially reducing their effective tax rate by 30-50%.

A qualified management agreement 210 may establish the operational framework allowing the business entity 202's former owner to continue managing the enterprise on behalf of the government entity 206. In some aspects, the qualified management agreement 210 may be structured to comply with IRS Revenue Procedure requirements for qualified management contracts, ensuring that the arrangement does not jeopardize the tax-exempt status of the net revenue bond 208. The agreement may grant comprehensive management authority to the former owner, including decisions regarding daily operations, staffing, marketing, purchasing, and strategic planning, while reserving certain fundamental decisions to the government entity 206. In certain implementations, the qualified management agreement 210 may specify compensation arrangements for the manager, typically structured as the business profits remaining after debt service on the net revenue bond 208, thereby aligning the manager's interests with business performance. The qualified management agreement 210 may include detailed provisions regarding financial reporting obligations, operational standards, compliance requirements, and termination conditions. In some examples, the qualified management agreement 210 may incorporate performance metrics and benchmarks that trigger review or renegotiation, as well as indemnification provisions protecting both parties and succession planning elements addressing potential management changes.

The operational control may be maintained (e.g., 212) within the transaction structure 200 to ensure business continuity throughout the ownership transfer period. In some implementations, various mechanisms may enable the business to continue operating without disruption despite a change in legal ownership. The former owner, acting under the qualified management agreement 210, may retain full authority over day-to-day business decisions, employee management, vendor relationships, and customer interactions. In certain aspects, operational control may be maintained by including provisions ensuring that existing business systems, processes, and procedures remain unchanged, that employee relationships and compensation structures continue without modification, and that the business's market presence and brand identity are preserved. The structure may allow the business to maintain its existing financial accounts, with modifications to accommodate the payment processing requirements of the tax management system. In some examples, operational control may extend to strategic decisions such as expansion plans, capital investments, and market positioning, subject to reasonable approval requirements from the government entity 206 for extraordinary transactions.

In some aspects, a license may be retained by an original owner (e.g., 214) to address an aspect of the transaction structure 200 to ensure that essential business licenses and permits remain with the original owner throughout the transaction period. In some aspects, this retention may be facilitated by the conditional nature of the conditional sales agreement 204, which delays actual asset transfer until full payment is received. Since the net revenue bond 208 is designed to remain in perpetual default, ownership of licensed assets never actually transfers, allowing the original owner to maintain operational licenses. In certain implementations, various types of authorizations and licenses may be maintained, including but not limited to liquor licenses for restaurants and bars, professional licenses for service-based businesses, regulatory permits for specialized industries, and franchise agreements that require specific ownership structures. This arrangement may eliminate the need for costly and time-consuming license transfers that could disrupt business operations or trigger regulatory scrutiny.

In some aspects, daily operations may be unchanged (e.g., 216), reflecting the transaction structure's design to minimize disruption to business activities. In some implementations, this may ensure that customers, employees, vendors, and other stakeholders do not experience noticeable changes in their interactions with the business. The business may continue to operate under its existing name and branding, maintain its current location and facilities, preserve all employee relationships and compensation structures, and honor all existing contracts and commitments. In certain aspects, one operational change may be the addition of payment processing through the tax management system to facilitate proper revenue allocation. In some instances, the unaltered nature of daily operations may be help to maintain customer loyalty, employee morale, and vendor confidence, all of which contribute to the business's ongoing profitability and success within the program.

The perpetual default status 218 (e.g., perpetual default condition) may represent a deliberately engineered feature of the transaction structure 200 that provides flexibility and protection for all parties. In some aspects, this status may result from the calculation methodology for the net revenue bond 208, which generates interest obligations exceeding the business's capacity to pay from available profits. The government entity 206 may technically be in default from the first day of the agreement, as the business can distribute its actual profits as debt service, leaving a portion of the interest obligation unpaid and deferred. In certain implementations, perpetual default status 218 may serve multiple purposes within the transaction structure: it may prevent the actual transfer of business assets by keeping the conditional sale incomplete, provide the business owner with potential exit rights through default remedies, and maintain the flexibility for the government entity to exit without having to unwind a completed acquisition. The perpetual default may be structured as a technical default, with no adverse credit implications for the government entity since the bonds are privately placed and unregistered. In some examples, the perpetual default status 218 may accumulate deferred interest over time. Still, this accumulated amount may be extinguished upon contract termination or renewal, ensuring that the government entity incurs no long-term liability.

The government exit option 220 may provide the government entity 206 with flexibility to terminate its participation in the transaction structure 200 without penalty. In some implementations, this option may be exercisable at any time during the one-year term, with minimal notice requirements to the business owner. The exit option may be triggered by various circumstances, including a significant decline in business revenues (typically more than 5%), geographic hazards affecting the business location, changes in government policy or priorities, or a determination that continued participation no longer serves the public interest. In certain aspects, the government exit option 220 may include provisions for an orderly transition, including notification procedures, final accounting and settlement of revenues, return of operational control to the original owner, and termination of all related agreements. The option may be structured to protect the government entity from losses while ensuring fair treatment of the business owner. In some examples, exercising the government exit option 220 may immediately terminate the tax benefits for the business owner going forward. Still, it may not create any retroactive tax liability, allowing both parties to benefit from the arrangement during its active period.

The business exit option 222 may provide corresponding flexibility for the business entity 202 to terminate participation in the transaction structure 200. In some aspects, this option may be exercised by the business owner through various mechanisms, primarily by leveraging the perpetual default status of 218 to invoke default remedies under the conditional sales agreement 204. The business owner may choose to exit if tax laws change unfavorably, business circumstances require different ownership structures, the anticipated tax benefits do not materialize as expected, or the administrative burden becomes excessive. In certain implementations, the business exit option 222 may require the business owner to fulfill any outstanding obligations to the government entity, provide adequate notice to facilitate an orderly transition and cooperate in the winding down of the payment processing arrangements. Unlike the government exit option, a business exit may require more formal procedures, given the business owner's role as the beneficiary of the tax advantages. In some examples, the business exit option 222 may be particularly valuable during economic uncertainty or business transitions, providing the flexibility to adapt to changing circumstances while having benefited from tax savings during the participation period.

In some implementations, the transaction structure 200 may integrate seamlessly with various modules of the tax management system 100. The contract generation module 116 may automatically create conditional sales agreement 204 and qualified management agreement 210 based on parameters established during the business valuation and matching process. The payment processing module 126 handles the complex fund flows required by the structure, ensuring the proper allocation of revenues according to the terms of the net revenue bond 208. The risk management module 120 may continuously monitor factors that could trigger exit options or require structure modifications. The revenue distribution module 118 may calculate and distributes the tax savings achieved through the structure, while the requalification module 132 manages the annual renewal process to maintain benefits for qualifying participants. This integration may ensure that the transaction structure 200 operates efficiently within the broader tax management system 100, delivering the intended benefits while maintaining compliance with all applicable regulations.

Figure 3:
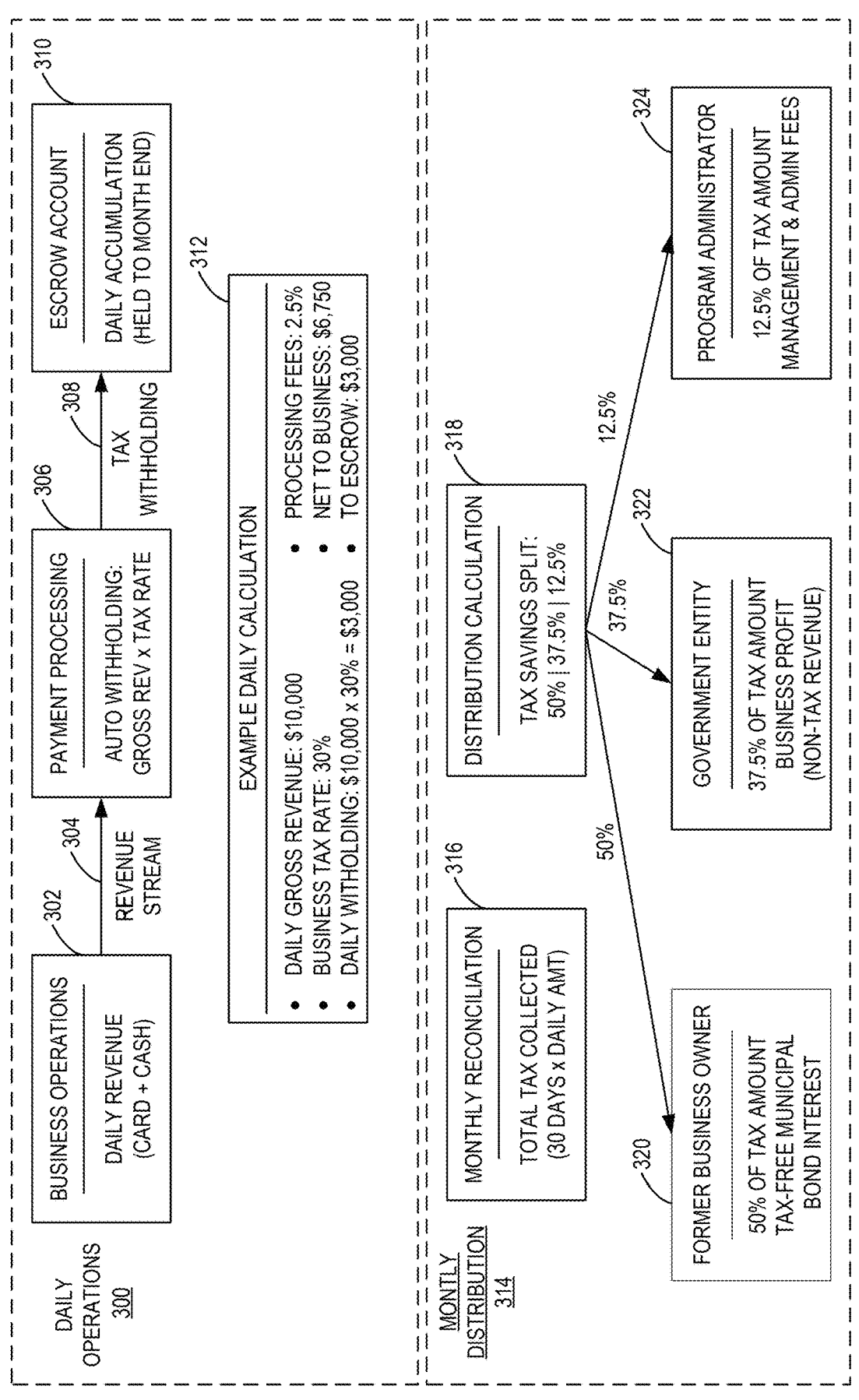
FIG. 3 illustrates a block diagram of a tax management system showing daily operations and monthly distribution processes, according to aspects of the present disclosure.

In some implementations, the tax management system 100 facilitates daily operations 300 and monthly distribution processes, as illustrated in FIG. 3. The payment processing and distribution flow represents the operational framework for capturing revenue, calculating tax obligations, and distributing benefits among participating entities within the tax optimization program.

The daily operations 300 may encompass continuous revenue capture and processing activities that occur throughout each business day. In some aspects, the daily operations 300 framework may be enclosed within a dashed boundary to indicate its recurring nature and integration with the broader tax management system. The framework may process thousands of individual transactions daily while maintaining real-time visibility into revenue flows and tax implications. In certain implementations, the daily operations 300 may incorporate automated processing capabilities to handle high transaction volumes without manual intervention. The framework may operate continuously during business hours, with batch processing capabilities for off-hours transactions, maintaining 24/7 availability for businesses operating in different time zones or with extended hours.

Business operations 302 may represent the core commercial activities of participating businesses within the tax optimization program. In some implementations, business operations 302 may encompass all revenue-generating activities conducted by the business entity, including retail sales, service delivery, wholesale transactions, and any other commercial activities that generate taxable income. The business operations 302 may continue unchanged from pre-program participation, with customers experiencing no difference in products, services, or transaction processes. In certain aspects, business operations 302 may include both card-based transactions (credit and debit cards) and cash transactions, with the system designed to capture and process all revenue types for accurate tax calculation. The business operations 302 may interface with existing point-of-sale systems, e-commerce platforms, and accounting software to ensure comprehensive revenue capture without requiring businesses to modify their operational systems significantly.

A revenue stream 304 may flow from business operations 302 to the payment processing infrastructure. In some aspects, the revenue stream 304 may represent the aggregate of all income generated by the business through its various commercial activities. The revenue stream may be captured in real-time as transactions occur, providing immediate visibility into business performance and enabling dynamic tax calculations. In certain implementations, the revenue stream 304 may include detailed transaction metadata such as transaction type, amount, timestamp, and payment method. The revenue stream may be encrypted and transmitted securely to protect sensitive financial information while ensuring compliance with Payment Card Industry (PCI) standards.

Payment processing 306 may serve as the central hub for handling financial transactions within the daily operations framework. In some implementations, payment processing 306 may integrate with multiple payment processors, acquiring banks, and financial networks to facilitate transaction handling across various payment methods. The payment processing 306 component may perform real-time authorization, settlement, and clearing functions while extracting transaction data for tax calculation purposes. In certain aspects, payment processing 306 may incorporate fraud detection algorithms, chargeback management processes, and reconciliation capabilities. The payment processing infrastructure may maintain redundant connections to multiple processors to ensure high availability and may implement automatic failover mechanisms to prevent transaction disruptions.

Tax withholding 308 may automatically calculate and segregate tax obligations from the processed revenue stream. In some implementations, tax withholding 308 may apply predetermined withholding rates based on the business's historical tax obligations and current tax rates. The tax withholding 308 component may perform real-time calculations on each transaction and determine the appropriate withholding amount by multiplying the transaction value by the applicable tax rate. In certain aspects, tax withholding 308 may incorporate algorithms that account for various factors, including business type, location, applicable tax jurisdictions, and any special tax considerations. The withholding calculations may be adjusted dynamically based on year-to-date performance, ensuring that the total withheld amount aligns with projected annual tax obligations while maintaining adequate cash flow for business operations.

An escrow account 310 may serve as a secure repository for withheld tax funds pending monthly distribution. In some implementations, the escrow account 310 may be established as a separate financial account with appropriate controls and oversight to ensure proper handling of funds. The account may be structured to comply with state regulations regarding escrow accounts and municipal fund management. In certain aspects, escrow account 310 maintains detailed records of deposits, including the source business identification, deposit date, and amount, which facilitates accurate monthly reconciliation and distribution processes. The escrow account may earn interest on deposited funds, with such interest allocated in accordance with program agreements. In some examples, the escrow account 310 may implement daily sweeps to maximize interest earnings while maintaining sufficient liquidity for operational needs.

An example daily calculation 312 display may provide transparency into the withholding methodology. In some implementations, the calculation display may show representative figures such as a daily gross revenue of $10,000 and a business tax rate of 30%, resulting in a daily withholding of $3,000. The display may also indicate the allocation of processing fees (shown as 2.5%) and net amounts flowing to different parties. In certain aspects, this calculation example may be dynamically updated based on actual business performance, providing real-time visibility into tax savings being generated.

A monthly distribution process may allocate accumulated funds to program participants. In many cases, this distribution occurs on a predetermined schedule, usually within the first few business days of each month, reflecting the activity from the previous month. In certain aspects, the monthly distribution 314 may incorporate multiple validation and reconciliation steps to ensure accuracy before funds are disbursed. The monthly distribution 314 process may generate detailed distribution reports for all parties, providing transparency and supporting accounting requirements.

Monthly reconciliation 316 may verify and finalize all transaction data before distribution calculations are made. In some implementations, monthly reconciliation 316 may compare payment processor reports with escrow account deposits, identify and resolve any discrepancies, and calculate final monthly totals for each participating business. The reconciliation process may incorporate a 30-day lookback period to capture late-arriving transactions or adjustments from the previous month. In certain aspects, monthly reconciliation 316 may generate exception reports highlighting any unusual patterns or potential issues requiring investigation before distribution. The process may interface with the database management module 136 to ensure all transaction records are complete and accurate.

Distribution calculation 318 may determine the precise allocation of tax savings among participating entities. In some implementations, distribution calculation 318 may apply the predetermined distribution formula to the reconciled monthly totals, calculating exact amounts due to each party. The calculation may split tax savings according to the established example ratios: 50% to the business owner, 37.5% to the government entity, and 12.5% to the program administrator. In certain aspects, distribution calculation 318 may also account for any adjustments, refunds, or chargebacks that occurred during the month, ensuring accurate net distributions. The calculation process may generate detailed breakdowns showing how each dollar of tax savings is allocated, supporting transparency and audit requirements.

The former business owner 320 may receive their portion of the tax savings as tax-free municipal bond interest. In some implementations, this distribution may account for 50% of the total tax amount, resulting in substantial tax savings compared to traditional business ownership structures. The payment may be processed as interest on the net revenue bond 208, qualifying for tax-exempt treatment under federal tax regulations. In certain aspects, the business owner distribution may be deposited directly into designated bank accounts via ACH transfer, with detailed statements showing the calculation methodology and tax treatment. The distribution may include year-to-date summaries to assist with tax planning and reporting requirements.

The government entity 322 may receive 37.5% of the tax amount as business profit. In some implementations, this distribution may provide unrestricted revenue that the government entity can use for any legitimate public purpose without the constraints typically associated with tax revenue. The payment may be processed through the government entity's standard financial systems, with appropriate coding for accounting and budgeting purposes. In certain aspects, the government entity distribution may be accompanied by detailed reports that show the performance of each business in its portfolio, enabling informed decisions about program participation and expansion.

The program administrator 324 may receive 12.5% of the tax amount as compensation for management and administrative services. In some implementations, this distribution may cover the costs of operating the tax management system 100, providing customer support, maintaining regulatory compliance, and facilitating all technical aspects of the program. The administrator's fee structure may align incentives by tying compensation directly to the program's success in generating tax savings. In certain aspects, the program administrator distribution may be structured to cover both fixed operational costs and variable costs that scale with program growth.

In some implementations, the payment processing and distribution flow is illustrated in FIG. 3 may integrate seamlessly with the system architecture shown in FIG. 1 and the transaction structure depicted in FIG. 2. The daily operations 300 may be managed by the payment processing module 126 and revenue distribution module 118, while the monthly distribution 314 process may be coordinated by the database management module 136 and monitored through the dashboard and visualization module 134. This integration ensures that all financial flows are properly tracked, calculated, and distributed by program requirements while maintaining full regulatory compliance and providing transparency to all participants.

In some implementations, the tax management system 100 may incorporate a risk management system as illustrated in FIG. 4. The risk management system may be an implementation of the risk management module 120 and may provide monitoring and analysis capabilities to identify, assess, and respond to various risk factors that could impact the tax-advantaged business transactions facilitated by the system.

A revenue monitoring module 402 may serve as a component for tracking the financial performance of participating businesses. In some aspects, the revenue monitoring module 402 may analyze revenue streams to detect patterns, anomalies, or concerning trends that could indicate business distress or operational challenges. The revenue monitoring module 402 may process transaction data in real time, comparing current performance against historical baselines and expected patterns based on industry norms and seasonal factors. In certain implementations, the revenue monitoring module 402 may employ statistical analysis techniques to distinguish between normal business fluctuations and significant deviations requiring attention. The revenue monitoring module 402 may maintain rolling averages and standard deviation calculations to establish dynamic baselines that adapt to legitimate business growth or contraction while still identifying unusual variations.

Threshold parameters 404 may define the acceptable ranges and trigger points for various monitoring activities within the risk management system. In some implementations, threshold parameters 404 may include configurable values such as percentage-based revenue decline limits, dollar amount variations, frequency of threshold breaches, and time-based recovery expectations. These parameters may be adjusted based on business type, size, industry sector, and historical volatility patterns. In certain aspects, threshold parameters 404 may incorporate both hard limits that trigger immediate action and soft limits that initiate enhanced monitoring or advisory notifications. The parameters can be stored in a structured format, allowing authorized administrators to easily modify them while maintaining an audit trail of all changes.

A day-over-day (D/D) revenue detector 406 may analyze short-term revenue fluctuations by comparing each day's performance to the previous day. In some implementations, the D/D revenue detector 406 may account for normal daily variations such as weekend effects, holiday impacts, and day-of-week patterns. The detector may calculate percentage changes and differences, flagging any variations that exceed predetermined thresholds. In certain aspects, the D/D revenue detector 406 may incorporate pattern recognition to identify businesses with inherently variable daily revenues versus those with typically stable patterns, adjusting sensitivity accordingly. The detector may generate time-series data that shows daily trends and identifies sudden drops, which could indicate operational issues, competitive actions, or external disruptions.

A week-over-week (W/W) revenue detector 408 may provide medium-term trend analysis by comparing weekly aggregated revenues. In some implementations, the W/W revenue detector 408 may smooth out daily variations while still maintaining sufficient granularity to detect emerging issues before they become impactful. The detector may align weekly comparisons to account for calendar effects, ensuring that weeks with holidays or other special events are appropriately normalized. In certain aspects, the W/W revenue detector 408 may calculate moving averages and trend lines to distinguish between temporary fluctuations and sustained directional changes in business performance.

A month-over-month (M/M) revenue detector, such as M/M detector 410, may evaluate longer-term business performance trends. In some implementations, the M/M detector 410 may provide strategic insights into business health by analyzing monthly revenue patterns over extended periods. The detector may incorporate seasonal adjustment factors to ensure fair comparisons between months with different characteristics. In certain aspects, the M/M detector 410 may identify gradual deterioration in business performance that might not trigger daily or weekly alerts but could indicate fundamental challenges requiring intervention.

A historical revenue database 412 may store comprehensive transaction and revenue data for all participating businesses. In some implementations, the historical revenue database 412 may maintain multiple years of historical data, enabling trend analysis, seasonality calculations, and predictive modeling. The historical revenue database 412 may store both raw transaction data and aggregated summaries at various time intervals. In certain aspects, the historical revenue database 412 may incorporate data compression and archival strategies to manage storage requirements while maintaining query performance. The historical revenue database 412 may support analytical queries, enabling correlation analysis between revenue patterns and external events.

A GIS integration module 414 may provide location-based risk assessment capabilities to the risk management system 400. In some implementations, the GIS integration module 414 may interface with multiple external data sources to gather real-time information about geographic and environmental factors that could impact business operations. The module may maintain precise location data for all participating businesses and continuously monitor for risk factors within relevant geographic boundaries. In certain aspects, the GIS integration module 414 may employ buffer zone analysis to assess risks at specific business locations and also in surrounding areas that could affect customer access, supply deliveries, or employee attendance.

A natural disaster monitor 416 may track environmental hazards that could impact business operations. In some implementations, the natural disaster monitor 416 may interface with national weather services, geological survey systems, and emergency management databases to identify threats such as hurricanes, tornadoes, earthquakes, floods, wildfires, and severe weather events. The monitor may assess both immediate threats and developing conditions that could impact businesses in the coming days or weeks.

In certain aspects, the natural disaster monitor 416 may calculate probability-weighted impact assessments based on hazard intensity, proximity to business locations, and historical impact data for similar events.

An infrastructure monitor 418 may assess risks related to infrastructure systems. In some implementations, the infrastructure monitor 418 may track conditions affecting transportation networks, power grids, water systems, telecommunications infrastructure, and internet connectivity. The monitor may identify both planned disruptions, such as construction projects, and unplanned events, such as bridge collapses or power plant failures. In certain aspects, the infrastructure monitor 418 may maintain dependency maps showing which businesses rely on specific infrastructure elements, enabling targeted risk assessment when infrastructure issues arise.

A civil events monitor 420 may track social and political factors that could impact business operations. In some implementations, the civil events monitor 420 may analyze data sources, including news feeds, social media trends, law enforcement communications, and event permits, to identify protests, demonstrations, civil unrest, large gatherings, or political events that could affect local businesses. The monitor may assess both the direct impact of events at business locations and their indirect effects, such as transportation disruptions or changes in customer behavior. In certain aspects, the civil events monitor 420 may incorporate sentiment analysis and crowd-sourcing techniques to identify emerging situations before they escalate.

A supply chain monitor 422 may evaluate risks to business operations arising from supply chain disruptions. In some implementations, the supply chain monitor 422 may track global shipping conditions, port operations, the status of the transportation network, raw material availability, and supplier reliability. The monitor may identify both direct supply chain risks affecting specific businesses and systemic risks that could impact entire industries or regions. In certain aspects, the supply chain monitor 422 may maintain supply chain maps for participating businesses, enabling assessment of cascade effects when disruptions occur at any point in the chain.

A hazard severity coding 424 may standardize the classification of identified risks. In some implementations, the hazard severity coding 424 may employ a multidimensional assessment framework that considers both the probability and potential impact of identified hazards. The coding system may utilize visual indicators, such as color codes (green for normal, yellow for warning, and red for impactful), combined with numerical scores for more precise risk quantification. In certain aspects, the hazard severity coding 424 may incorporate temporal factors, adjusting severity ratings based on the proximity of threats and expected duration of impacts.

An alert generation module 426 may create and distribute notifications based on risk factors identified by various monitoring components. In some implementations, the alert generation module 426 may utilize intelligent routing to ensure that alerts are delivered to the appropriate stakeholders through their preferred communication channels. The module may incorporate alert fatigue prevention mechanisms, consolidating related alerts and suppressing redundant notifications while ensuring that impactful information is not overlooked. In certain aspects, the alert generation module 426 may maintain alert templates for different scenarios, enabling the rapid generation of comprehensive notifications that include relevant context, recommended actions, and escalation procedures.

A revenue alert generator 428 may initiate notifications when financial performance deviates from acceptable parameters. In some implementations, the revenue alert trigger 428 may activate based on configurable conditions such as revenue declines exceeding 5% on daily, weekly, or monthly comparisons. The trigger may incorporate complex logic considering multiple factors, including the magnitude of change, duration of decline, and business-specific characteristics. In certain aspects, the revenue alert trigger 428 may implement graduated responses, with different actions triggered at various threshold levels.

A revenue alert generator 428 may create detailed notifications regarding financial performance issues. In some implementations, the revenue alert generator 428 may produce comprehensive alerts, including current revenue figures, historical comparisons, trend visualizations, and preliminary impact assessments. The alerts may be formatted for different audiences, with executive summaries for decision-makers and detailed analytical reports for financial analysts. In certain aspects, the revenue alert generator 428 may incorporate predictive elements, projecting future performance based on current trends and recommending proactive interventions.

A geographic hazard alert generator 430 may produce notifications related to location-based risks. In some implementations, geographic hazard alert generator 430 may create map-based visualizations that show affected areas, potentially impacted businesses, and the progression of hazards over time. The alerts may include specific guidance for businesses in affected areas, such as recommended protective actions or temporary operational adjustments. In certain aspects, the geographic hazard alert generator 430 may provide multi-scenario planning information, showing best-case, likely-case, and worst-case impact projections.

A critical alert generator 432 may handle high-priority notifications requiring immediate action. In some implementations, the critical alert generator 432 may bypass normal notification channels to ensure rapid delivery through multiple simultaneous methods, including email, SMS, phone calls, and mobile app push notifications. The generator may implement acknowledgment tracking to ensure critical alerts are received and acted upon. In certain aspects, the critical alert generator 432 may automatically initiate response protocols, such as scheduling emergency meetings or activating crisis management teams.

A risk analysis engine 434 may provide processing and interpretation of risk-related data. In some implementations, the risk analysis engine 434 may employ machine learning algorithms to identify complex risk patterns and predict future risk events based on historical data and current indicators. The risk analysis engine 434 may perform a multi-factor analysis considering interactions between different risk types and their cumulative effects on business operations. In certain aspects, the risk analysis engine 434 may generate risk heat maps, probability distributions, and scenario analyses to support informed decision-making.

A data correlation processor 436 may identify relationships between different risk factors and business outcomes. In some implementations, the data correlation processor 436 may employ statistical correlation analysis, regression modeling, and causation analysis to understand how various risk factors interact and influence business performance. The processor may identify leading indicators that predict future revenue impacts, enabling proactive risk mitigation. In certain aspects, the data correlation processor 436 may construct correlation matrices that reveal relationships between environmental factors, infrastructure conditions, and business performance metrics.

A pattern recognition processor 438 may detect recurring risk scenarios and emerging trends. In some implementations, the pattern recognition processor 438 may employ neural networks and deep learning techniques to identify subtle patterns in large datasets that might not be apparent through traditional analysis. The processor may recognize seasonal risk patterns, industry-specific vulnerabilities, and geographic clustering of risk events. In certain aspects, the pattern recognition processor 438 may continuously refine its models based on new data, improving prediction accuracy over time.

A risk score calculator 440 may generate quantitative assessments of overall risk levels. In some implementations, the risk score calculator 440 may combine multiple risk factors into composite scores using weighted algorithms that reflect the relative importance of different risk types. The scores may be normalized to enable comparison across various businesses, periods, and risk categories. In certain aspects, the risk score calculator 440 may provide confidence intervals and sensitivity analyses showing how changes in individual risk factors affect overall risk assessments.

An administrator alert generator 442 may create specialized notifications for program administrators. In some implementations, administrator alert generator 442 may produce comprehensive dashboard views showing system-wide risk status, trending issues, and recommended administrative actions. The alerts may include portfolio-level analytics showing risk concentration, correlation effects, and potential systemic vulnerabilities. In certain aspects, the administrator alert generator 442 may provide decision support tools, including cost-benefit analyses of different response options and regulatory compliance implications.

A manual override processor 444 may enable human intervention in automated risk management processes. In some implementations, manual override processor 444 may provide interfaces for administrators to adjust risk thresholds, suppress specific alerts, or override automated decisions based on additional context or expertise. The processor may maintain detailed audit logs of all manual interventions, including justifications and outcomes, to ensure transparency and accountability. In certain aspects, the manual override processor 444 may implement approval workflows for significant overrides, ensuring appropriate oversight while maintaining operational flexibility.

An auto opt-out trigger 446 may initiate automatic exit procedures in high-risk scenarios. In some implementations, auto opt-out trigger 446 may activate when composite risk scores exceed critical thresholds or when specific catastrophic events occur. The trigger may initiate a controlled exit process that protects the interests of all parties while complying with contractual obligations. In certain aspects, the auto opt-out trigger 446 may provide graduated responses, initiating enhanced monitoring at lower thresholds and automatic exit in extreme circumstances. The trigger may incorporate safeguards to prevent premature exits while ensuring rapid response to protect public funds and program integrity.

In some implementations, the risk management system 400 may integrate with other components of the tax management system 100. The system may provide risk data to the dashboard and visualization module 134 for presentation to stakeholders, interface with the revenue distribution module 118 to adjust payment processing based on risk levels and coordinate with the requalification module 132 to incorporate risk assessments into renewal decisions.

Figure 5:
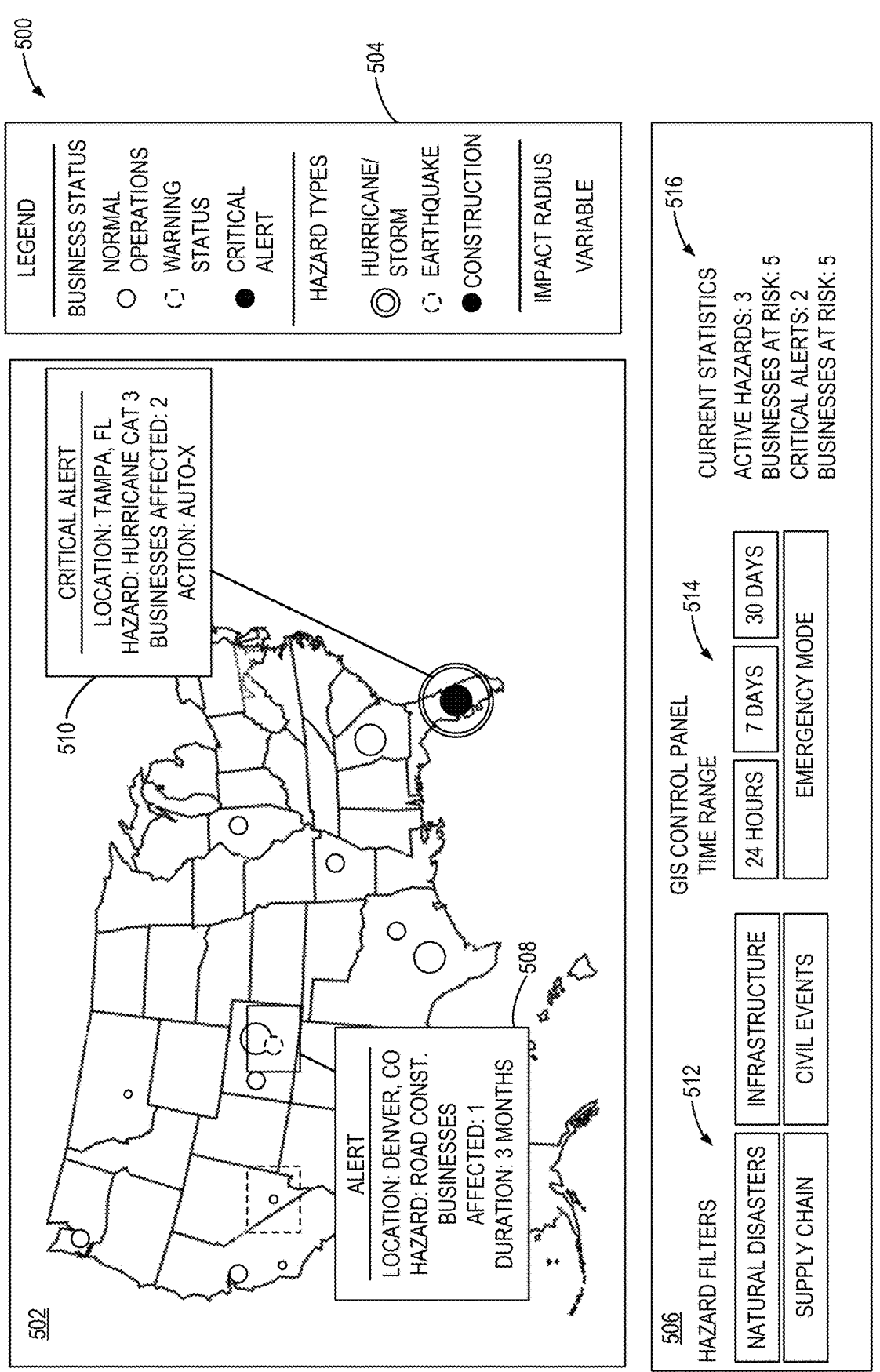
FIG. 5 illustrates a block diagram of a geographic information system (GIS) interface for monitoring business risks and hazards, according to aspects of the present disclosure.

In some implementations, the tax management system 100 may incorporate a GIS display container 500, as illustrated in FIG. 5. The GIS display container 500 may provide a geographic visualization interface for monitoring location-based risks and their potential impacts on participating businesses within the tax optimization program.

A map display 502 may serve as a visual component of the GIS display container 500. In some aspects, the map display 502 presents a geographic representation of the operational area, showing the locations of participating businesses and government entities, along with various risk factors and hazards. The map display 502 may utilize interactive mapping technology that allows users to zoom, pan, and navigate across different geographic regions to examine specific areas of interest. In certain implementations, the map display 502 may support multiple map layers, including satellite imagery, street maps, topographic views, and specialized overlays for different types of hazards. The display may incorporate real-time data feeds to show current conditions and may update dynamically as new risk information becomes available.

A legend 504 may be positioned adjacent to the map display 502 to guide the interpretation of the various symbols, colors, and indicators used throughout the geographic visualization. In some implementations, the legend 504 may categorize different types of information, including business status indicators, hazard classifications, and severity levels. The legend may use standardized symbols and color coding consistent with the hazard severity coding 424 system, employing, for example, green indicators for normal conditions, yellow for warning states, and red for critical situations. In certain aspects, the legend 504 may be interactive, allowing users to toggle different information layers on and off by selecting or deselecting items within the legend interface.

A GIS control panel 506 may provide user interface controls for interacting with and customizing the map display 502. In some aspects, the GIS control panel 506 may include navigation controls for zooming and panning, layer selection options for choosing which types of information to display, and search functionality for locating specific businesses or geographic features. The control panel may incorporate measurement tools for calculating distances and areas, drawing tools for marking regions of interest, and export functions for generating reports or sharing map views. In certain implementations, the GIS control panel 506 may provide access to historical data, allowing users to view past conditions and track the evolution of risk factors over time.

An alert notification 508 may appear on the map display 502 to highlight specific risk conditions affecting individual businesses or geographic areas. In some implementations, the alert notification 508 may provide detailed information about identified risks, including the nature of the hazard, affected businesses, estimated impact levels, and recommended actions. The notification may be triggered by the geographic hazard alert generator 430 when location-based risks are detected that could impact business operations. In certain aspects, the alert notification 508 may include clickable elements that provide access to additional detailed information, historical context, and related alerts in the same geographic area.

A critical alert notification 510 may display high-priority warnings that require immediate attention from system administrators or government entities. In some aspects, the critical alert notification 510 may be visually distinct from standard alert notifications, using enhanced visual indicators such as flashing elements, bold colors, or prominent positioning to ensure visibility. The notification may be generated by the critical alert generator 432 when severe risk conditions are detected that could significantly impact business operations or public safety. In certain implementations, the critical alert notification 510 may include direct action buttons enabling users to initiate emergency response procedures, contact relevant authorities, or trigger automated protective measures.

A hazard filter panel 512 may enable users to customize which types of risk information are displayed on the map. In some implementations, the hazard filter panel 512 may provide selectable categories corresponding to the different monitoring components within the GIS integration module 414, including natural disasters, infrastructure issues, civil events, and supply chain disruptions. Users may select or deselect specific hazard types to focus their analysis on particular risk categories relevant to their responsibilities or interests. In certain aspects, the hazard filter panel 512 may include severity level filters, allowing users to display hazards above certain threshold levels, and temporal filters for showing risks within specific time ranges.

A time range selector 514 may allow users to specify the temporal scope of the risk information displayed on the map. In some aspects, the time range selector 514 may provide predefined options, such as current conditions, a 24-hour outlook, a 7-day forecast, and a 30-day historical view. The selector enables users to analyze risk patterns across different periods and supports custom date range selection for detailed historical analysis. In certain implementations, the time range selector 514 may include an emergency mode option that focuses the display on immediate threats and current critical conditions, filtering out longer-term or less urgent risk factors.

A statistics display, such as 516, may present quantitative summaries of the risk information shown on the map. In some implementations, the statistics display 516 may show aggregate counts of active hazards, businesses at risk, critical alerts, and the total number of businesses affected by current conditions. The display may provide real-time updates as conditions change and may include trend indicators showing whether risk levels are increasing, decreasing, or remaining stable. In certain aspects, the statistics display 516 may present comparative data showing current conditions relative to historical averages, seasonal norms, or other relevant benchmarks.

In some implementations, the GIS display container 500 may integrate data from multiple components of the risk management system 400. The natural disaster monitor 416, infrastructure monitor 418, civil event monitor 420, and supply chain monitor 422 may all contribute to location-based risk data that is visualized through the map display 502. The hazard severity coding 424 system may determine the visual representation of different risks, while the various alert generators may trigger the display of alert notifications when significant conditions are detected. The GIS display container 500 may also interface with the database management module 136 to access historical risk data and with the dashboard and visualization module 134 to provide geographic risk information for inclusion in broader system dashboards.

The GIS display container 500 may enable users of the tax management system 100 to quickly assess geographic risk factors affecting participating businesses, identify spatial patterns in risk distribution, and make informed decisions about risk mitigation strategies. The interface may support both strategic planning activities and real-time operational responses to emerging risk conditions, providing a comprehensive geographic perspective on the risk management aspects of the tax optimization program.

Figure 6:
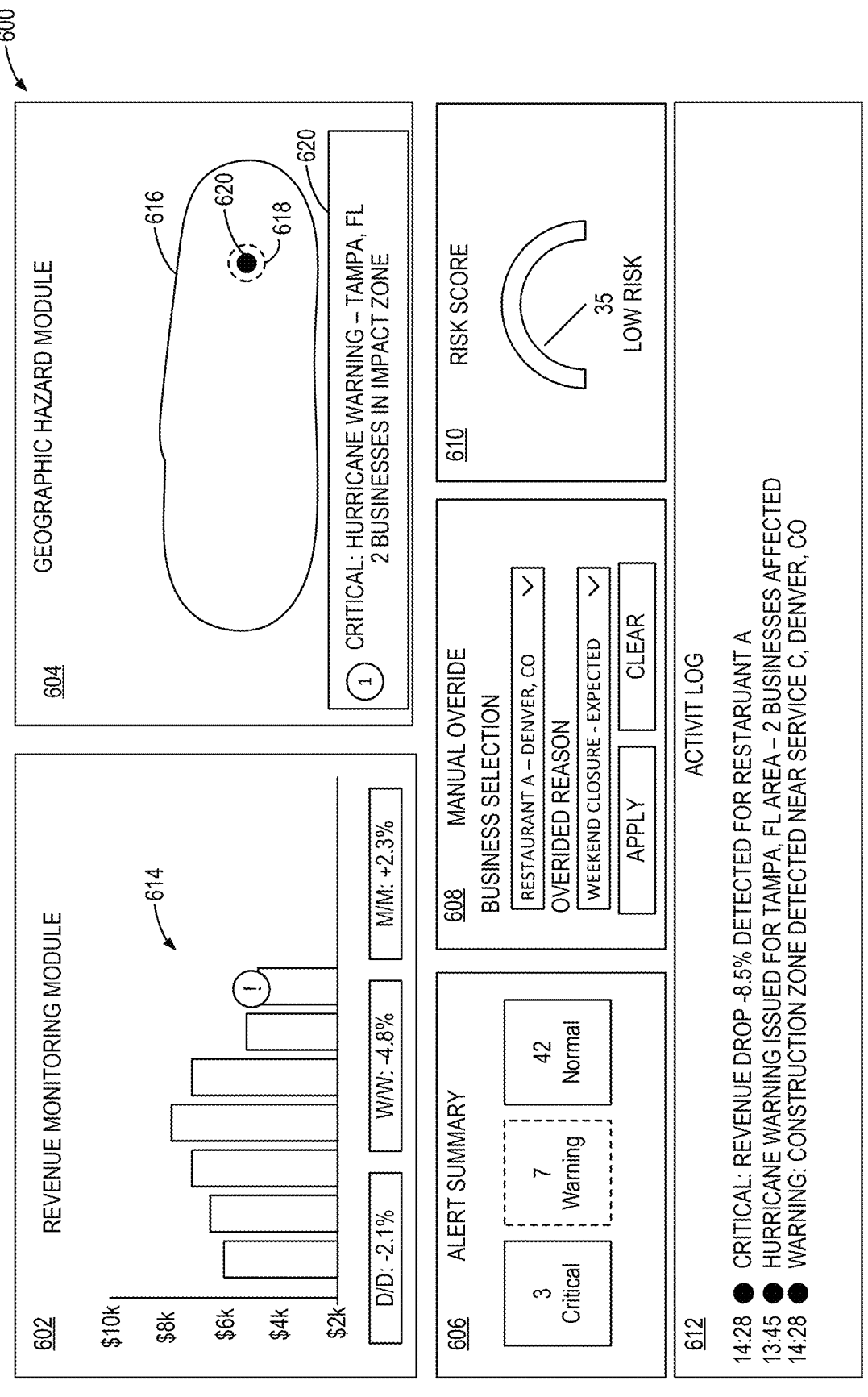
FIG. 6 illustrates a block diagram of a business monitoring and risk assessment system, according to aspects of the present disclosure.

In some implementations, the tax management system 100 may incorporate a threshold alert dashboard 600, as illustrated in FIG. 6. The threshold alert dashboard 600 may provide a comprehensive monitoring interface that consolidates various risk assessment and business performance indicators into a unified view for system administrators and stakeholders.

A revenue monitoring module 602 may serve as a component for tracking financial performance metrics across participating businesses. In some aspects, the revenue monitoring module 602 may display real-time and historical revenue data through visual representations that enable quick identification of performance trends and anomalies. The module may incorporate a revenue chart 614 that presents financial metrics in graphical format, showing day-over-day, week-over-week, and month-over-month percentage changes in business performance. In certain implementations, the revenue chart 614 may utilize color-coded indicators to highlight businesses experiencing significant revenue fluctuations, with green indicating stable performance, yellow showing moderate changes, and red signaling concerning declines that may require intervention.

A geographic hazard module 604 may provide spatial visualization of location-based risks affecting participating businesses. In some implementations, the geographic hazard module 604 may display a map-based interface that shows the geographic distribution of businesses and their associated risk factors. The module may incorporate a hazard boundary 616 that delineates areas affected by specific geographic risks such as natural disasters, infrastructure disruptions, or civil events. A hazard location indicator 618 may mark the precise location or epicenter of identified risks, while an impacted business indicator 620 may highlight businesses that fall within the affected zones. In certain aspects, the geographic hazard module 604 provides layered visualization capabilities, enabling users to view multiple types of hazards simultaneously and assess cumulative risk exposure across different geographic regions.

An alert summary module 606 may consolidate and categorize various types of alerts generated by the risk management system depicted in FIG. 4. In some aspects, the alert summary module 606 may provide status indicators for different alert levels, including critical, warning, and normal conditions across the monitored business portfolio. The module displays aggregate counts of active alerts by category and severity level, enabling administrators to assess the overall risk status of the system quickly. In certain implementations, the alert summary module 606 may incorporate trend indicators showing whether alert conditions are improving, deteriorating, or remaining stable over time.

A manual override module 608 may provide administrative controls for human intervention in automated risk management processes. In some implementations, the manual override module 608 may include business selection controls that allow administrators to choose specific businesses for manual review or intervention. The module may provide override options that enable authorized personnel to suppress specific alerts, adjust risk thresholds, or modify automated responses based on additional context or expertise. In certain aspects, the manual override module 608 may incorporate approval workflows and audit logging to ensure appropriate oversight of manual interventions while maintaining operational flexibility.

A risk score module 610 may present quantitative risk assessments for individual businesses or the overall portfolio. In some aspects, the risk score module 610 may display composite risk scores calculated by the risk score calculator 440, presenting the information through gauge-style indicators or numerical displays that provide immediate visual feedback on current risk levels. The module may incorporate color-coded thresholds that correspond to different risk categories, allowing for the quick identification of businesses or conditions that require attention. In certain implementations, the risk score module 610 may provide drill-down capabilities, enabling users to examine the individual risk factors that contribute to overall risk scores.

An activity log module 612 may maintain a chronological record of system events, alerts, and administrative actions. In some implementations, the activity log module 612 may display recent system activities, including alert generation, breaches of risk thresholds, manual overrides, and automated responses. The module may provide filtering and search capabilities, enabling users to locate specific events or track the evolution of particular risk conditions over time. In certain aspects, the activity log module 612 may incorporate export functionality to generate reports or maintain compliance documentation.

In some implementations, the threshold alert dashboard 600 may integrate seamlessly with other components of the tax management system 100. The dashboard may receive data from the risk management system depicted in FIG. 4, including inputs from the revenue monitoring module 402, GIS integration module 414, and various alert generators. The dashboard may also interface with the database management module 136 to access historical data and with the manual override processor 444 to implement administrative decisions. This integration may enable the threshold alert dashboard 600 to provide a comprehensive view of system status while supporting both automated monitoring and manual intervention capabilities.

The threshold alert dashboard 600 may enable system administrators and stakeholders to monitor business performance and risk factors through an integrated interface that combines financial metrics, geographic hazards, and alert conditions.

Figure 7:
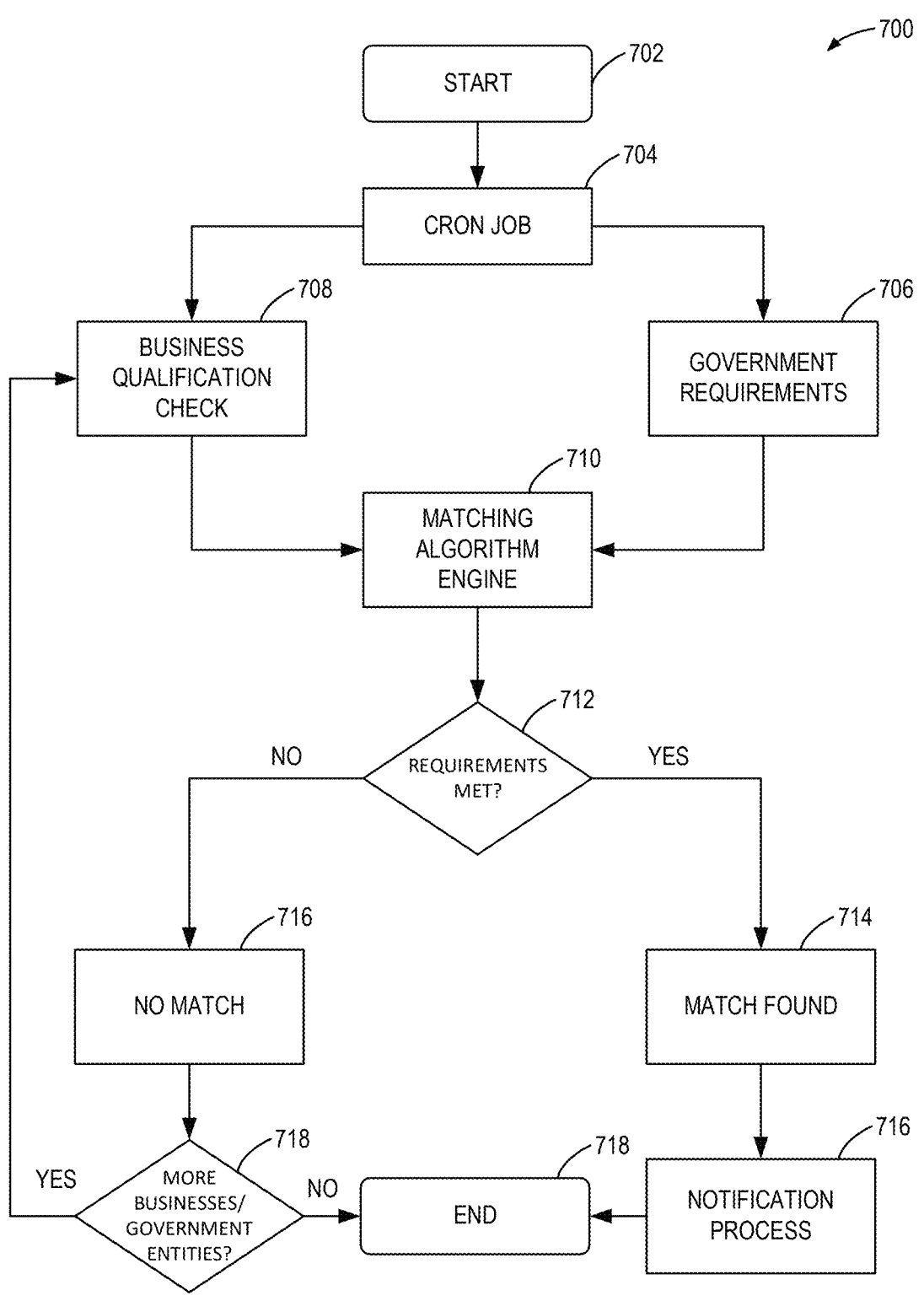
FIG. 7 illustrates a flowchart of an automated matching process, according to aspects of the present disclosure.

In some implementations, the tax management system 100 may incorporate an automated matching process 700, as illustrated in FIG. 7. The automated matching process 700 may provide a systematic workflow for identifying and pairing compatible businesses with appropriate government entities within the tax optimization program.

The automated matching process 700 may begin with a start step 702 that initiates the matching workflow. In some aspects, the start of step 702 may be triggered by various events, including new business applications, government entity registrations, changes in business qualifications, or scheduled periodic reviews. The start step 702 may establish the initial parameters and context for the matching operation, including the scope of businesses and government entities to be considered in the current matching cycle.

A CRON job step 704 may follow the start step 702 to provide automated scheduling and execution of the matching process. In some implementations, the CRON job step 704 may execute the matching algorithm at predetermined intervals, such as daily, weekly, or monthly, depending on system configuration and operational requirements. Specific events, such as the addition of new participants or changes in qualification status, may also trigger the CRON job. In certain aspects, the CRON job step 704 may incorporate load balancing and resource management features to ensure optimal system performance during matching operations.

The automated matching process 700 may branch into two parallel evaluation paths from the CRON job step 704. A government requirement step 706 may evaluate the investment criteria and preferences of participating government entities. In some implementations, the government requirements step 706 may retrieve and analyze government entity profiles, including minimum revenue thresholds, prohibited industry classifications, geographic restrictions, available funding capacity, and risk tolerance parameters. The step may also consider the current portfolio composition to ensure appropriate diversification and may incorporate policy constraints or regulatory requirements that affect investment decisions.

A business qualification check step 708 may simultaneously evaluate the eligibility and characteristics of participating businesses. In some aspects, the business qualification check step 708 may verify that businesses meet minimum program requirements, including profitability thresholds, operational history, regulatory compliance status, and industry eligibility. The step may analyze financial performance data, tax returns, and other documentation to confirm qualification status. In certain implementations, the business qualification check step 708 may also assess business-specific factors such as seasonal variations, growth trends, and operational stability that may affect matching compatibility.

A matching algorithm engine step 710 may receive inputs from both the government requirements step 706 and the business qualification check step 708 to perform the actual compatibility analysis. In some implementations, the matching algorithm engine step 710 may employ algorithms that consider multiple compatibility factors, including geographic proximity, business size, revenue levels, industry alignment with government preferences, risk profiles, and potential tax savings. The engine may utilize machine learning techniques to improve matching accuracy over time based on historical transaction success rates and participant feedback. In certain aspects, the matching algorithm engine step 710 generates compatibility scores for each potential business-government pairing and ranks matches based on these scores to prioritize the most promising combinations.

A requirements decision step 712 may evaluate whether potential matches meet the established criteria for both parties. In some aspects, the requirements decision step 712 may apply threshold tests to determine if compatibility scores exceed minimum acceptable levels and if all mandatory requirements are satisfied. The decision-making step may consider both quantitative factors, such as financial metrics, and qualitative factors, such as strategic alignment. In certain implementations, the requirements decision step 712 may incorporate multiple decision criteria, including minimum compatibility scores, compliance with mandatory requirements, and the availability of both parties for new transactions.

If the requirements are met, the automated matching process 700 may proceed to a match found in step 714. In some implementations, the match found in step 714 may record the successful match in the system database, assign unique identifiers to the matched pairing, and prepare the match data for subsequent processing steps. The step may also update the availability status of both the business and government entities to prevent duplicate matching during the current cycle.

A notification process step 716 may follow the match found step 714 to inform relevant parties about successful matches. In some aspects, the notification process step 716 may generate and distribute notifications to matched businesses and government entities through their preferred communication channels, including email, SMS, or system dashboard alerts. The notifications may include detailed information about the matched party, compatibility factors, next steps in the transaction process, and contact information for further coordination. In certain implementations, the notification process step 716 may also alert program administrators about successful matches and may trigger the initiation of contract generation and due diligence processes.

If the requirements are not met at the requirements decision step 712, the automated matching process 700 may proceed to a no match step 716. In some implementations, the no-match step 716 may log the unsuccessful matching attempt, update matching statistics, and prepare the system to continue evaluating other potential combinations. The step may also record the reasons for match failure to support system optimization and participant feedback.

From the no-match step 716, the process may continue to a decision step 718 that determines whether additional businesses or government entities remain to be evaluated in the current matching cycle. In some aspects, the decision step 718 may check the availability of unmatched participants and may consider system resource constraints and time limitations. If additional participants are available for matching, the process may return to the CRON job step 704 to continue the matching cycle with the remaining participants.

If no additional participants are available for matching, or if the matching cycle is complete, the automated matching process 700 may proceed to an end step. In some implementations, the end step may finalize the matching cycle by generating summary reports, updating system statistics, and scheduling the next matching cycle. The end step may also trigger cleanup processes to prepare the system for subsequent matching operations.

The automated matching process 700 may integrate with various components of the tax management system 100 to access participant data and system resources. The method may interface with the database management module 136 to retrieve business and government entity profiles, with the automated matching module 110 to execute matching algorithms, and with the dashboard and visualization module 134 to provide matching statistics and results. This integration may enable the automated matching process 700 to operate efficiently within the broader tax optimization program while maintaining data consistency and system performance.

Figure 8:
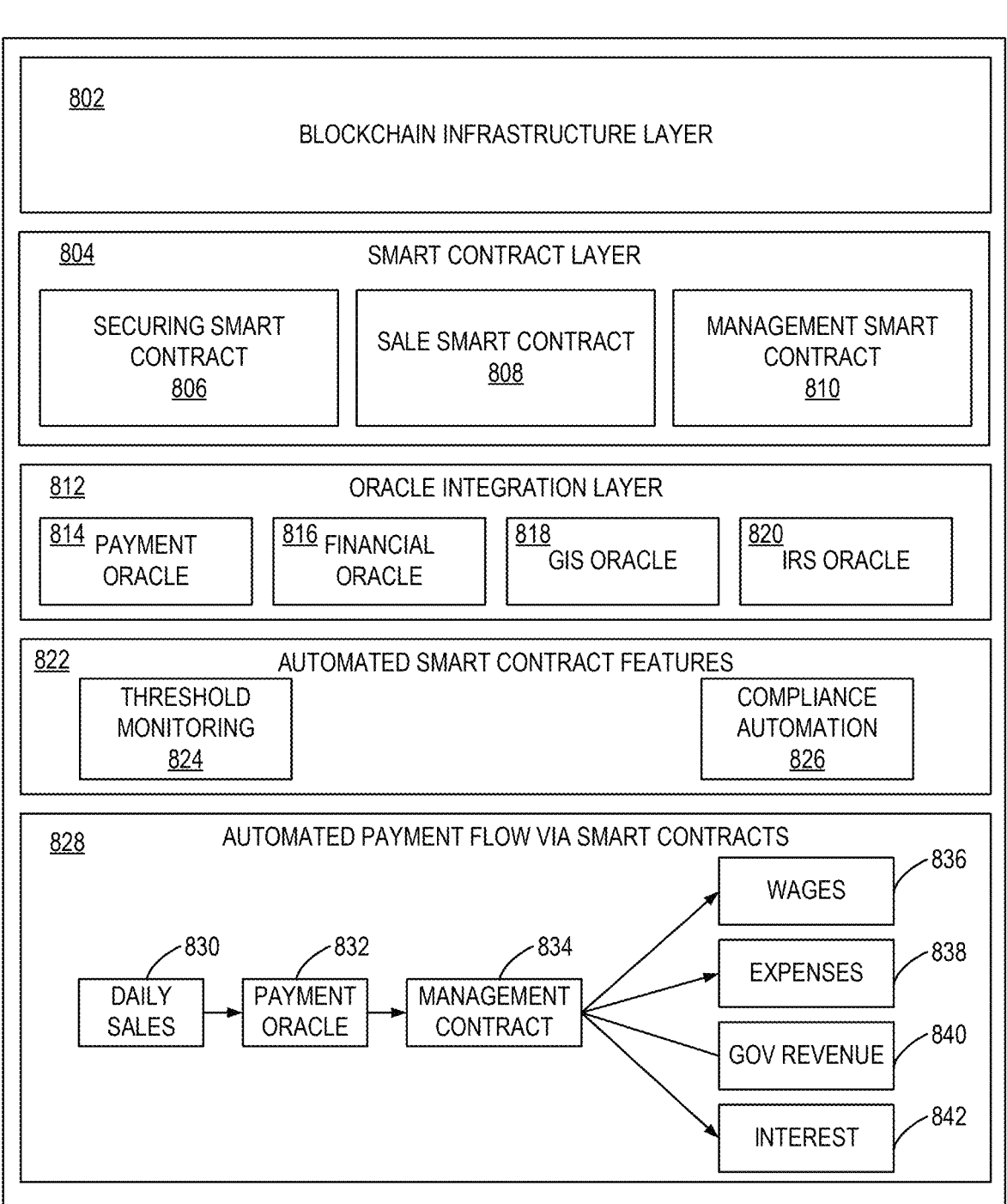
FIG. 8 illustrates a block diagram of a system architecture for managing tax-advantaged business transactions, according to aspects of the present disclosure.

In some implementations, the tax management system 100 may incorporate a system architecture 800, as illustrated in FIG. 8. The system architecture 800 may provide a blockchain-based framework for managing tax-advantaged business transactions with enhanced security, automation, and compliance capabilities.

A blockchain infrastructure layer 802, can provide distributed ledger capabilities that ensure transaction immutability, transparency, and security across all system operations. This infrastructure can use consensus mechanisms to validate transactions and maintain data integrity, while also supporting the scalable processing of multiple business transactions simultaneously. In certain implementations, the blockchain infrastructure layer 802 may incorporate permissioned blockchain technology that allows controlled access to transaction data while maintaining privacy and regulatory compliance requirements.

A smart contract layer 804 may be positioned above the blockchain infrastructure layer 802 to provide automated contract execution and enforcement capabilities. In some implementations, the smart contract layer 804 may contain multiple specialized smart contracts that handle different aspects of tax-advantaged business transactions. The layer may enable self-executing contracts with terms directly written into code, reducing the need for manual intervention and ensuring consistent application of program rules and regulations.

A securing smart contract 806 may be incorporated within the smart contract layer 804 to provide security and access control functions. In some aspects, the securing smart contract 806 may manage authentication, authorization, and encryption protocols for all system participants. The contract may implement multi-signature requirements for critical transactions, role-based access controls for different user types, and audit trail functionality to track all system interactions. In certain implementations, the securing smart contract 806 may incorporate fraud detection algorithms and automated security responses to protect against unauthorized access or malicious activities.

A sale smart contract 808 may handle the conditional sales agreement aspects of the transaction structure. In some implementations, the sale smart contract 808 may automate the creation, execution, and management of conditional sales agreements between businesses and government entities. The contract may incorporate the business valuation calculations, payment terms, and conditional ownership transfer mechanisms described in the transaction structure 200. In certain aspects, the sale smart contract 808 may automatically execute ownership transfers when payment conditions are met and may handle the perpetual default status mechanics that maintain flexibility for both parties.

A management smart contract 810 may govern the qualified management agreement provisions of the system. In some aspects, the management smart contract 810 may automate the establishment and enforcement of management agreements that allow former business owners to continue operating their businesses on behalf of government entities. The contract may incorporate performance monitoring, compliance checking, and automated responses to management agreement violations. In certain implementations, the management smart contract 810 may interface with external data sources to verify ongoing compliance with the requirements of a qualified management contract under federal tax regulations.

An oracle integration layer 812 may provide connectivity between the blockchain-based smart contracts and external data sources required for system operations. In some implementations, the oracle integration layer 812 may serve as a bridge that enables smart contracts to access real-world data while maintaining the security and integrity of the blockchain infrastructure. The layer may incorporate multiple specialized oracles that handle different types of external data feeds and may implement data validation and verification protocols to ensure accuracy and reliability.

A payment oracle 814 may be included within the oracle integration layer 812 to provide real-time payment and transaction data to the smart contracts. In some aspects, the payment oracle 814 may interface with payment processors, banking systems, and financial networks to capture transaction data as it occurs. The oracle may provide verified payment information to smart contracts for automated processing and distribution calculations. In certain implementations, the payment oracle 814 may incorporate data aggregation capabilities to consolidate transaction information from multiple payment channels and may implement real-time fraud detection and validation protocols.

A financial oracle 816 may supply financial market data and business valuation information to smart contracts. In some implementations, the financial oracle 816 may interface with industry data services to provide current price-to-earnings ratios, market conditions, and other financial metrics required for business valuations and contract terms. The oracle may also offer interest rate information, tax rate updates, and other financial parameters that affect the calculation of tax savings and fund distributions. In certain aspects, the financial oracle 816 may incorporate data quality assurance mechanisms to ensure the accuracy and timeliness of financial information used in automated calculations.

A GIS oracle 818 may provide geographic and environmental data for risk management purposes. In some aspects, the GIS oracle 818 may interface with geographic information services, weather monitoring systems, and emergency management databases to provide location-based risk information to the smart contracts. The oracle may supply data about natural disasters, infrastructure conditions, and other geographic factors that could impact business operations. In certain implementations, the GIS oracle 818 may incorporate real-time monitoring capabilities and may trigger automated responses when geographic risks exceed predetermined thresholds.

An IRS oracle 820 may provide tax regulation and compliance information to ensure ongoing adherence to federal tax requirements. In some implementations, the IRS oracle 820 may interface with tax databases and regulatory systems to provide current tax rates, regulation updates, and compliance requirements that affect the tax-advantaged structure of the transactions. The oracle may monitor changes in tax laws that could impact the program and may trigger automated adjustments to contract terms or system operations. In certain aspects, the IRS oracle 820 may incorporate compliance verification capabilities to ensure that all transactions maintain their tax-advantaged status.

Automated smart contract features 822 may provide advanced automation capabilities that enhance system efficiency and compliance. In some aspects, the automated smart contract features 822 may incorporate machine learning algorithms, predictive analytics, and automated decision-making capabilities that reduce the need for manual intervention while maintaining program integrity. The features may enable the system to adapt to changing conditions and optimize performance based on historical data and emerging patterns.

A threshold monitoring module 824 may be included within the automated smart contract features 822 to provide continuous monitoring of key performance indicators and risk factors. In some implementations, the threshold monitoring module 824 may automatically track revenue changes, risk levels, and other critical metrics across all participating businesses. The module may implement the threshold-based alerting and response mechanisms described in the risk management system 400. In certain aspects, the threshold monitoring module 824 may incorporate predictive capabilities that identify potential issues before they reach critical levels, triggering proactive interventions to maintain program stability.

A compliance automation module, such as 826, may ensure ongoing adherence to regulatory requirements and program rules. In some aspects, the compliance automation module 826 may automatically verify that all transactions and operations comply with federal tax regulations, municipal bond requirements, and other applicable laws. The module may perform continuous compliance checking, generate required regulatory reports, and implement automated corrective actions when compliance issues are detected. In certain implementations, the compliance automation module 826 may incorporate regulatory change monitoring capabilities that automatically update system operations when new regulations are implemented.

An automated payment flow 828 may manage the complex fund distribution processes described in the daily operations 300 and monthly distribution 314 components. In some implementations, the automated payment flow 828 may process all payment transactions through interconnected smart contract modules that ensure accurate calculation and distribution of funds according to program requirements. The flow may incorporate real-time processing capabilities that enable immediate fund allocation while maintaining comprehensive audit trails and compliance documentation.

A daily sales module 830 may capture and process daily business revenue data within the automated payment flow 828. In some aspects, the daily sales module 830 may interface with point-of-sale systems, e-commerce platforms, and other revenue sources to capture transaction data in real time. The module may perform automated validation and verification of sales data and may calculate daily withholding amounts based on predetermined tax rates and allocation formulas.

A payment oracle 832 within the automated payment flow 828 may provide verified payment data to the distribution smart contracts. In some implementations, the payment oracle 832 may serve as a specialized component that ensures payment data accuracy and completeness before fund distribution calculations are performed. The oracle may incorporate multiple data validation layers and may interface with banking systems to verify actual fund availability before authorizing distributions.

A management contract module 834 may serve as the central distribution hub within the automated payment flow 828. In some aspects, the management contract module 834 may receive processed payment data and execute the fund allocation algorithms that distribute tax savings among participating entities. The module may implement the distribution ratios described in the revenue distribution module 118 and may ensure that all distributions comply with municipal bond interest payment requirements.

A wages module 836 may handle employee compensation and payroll-related distributions within the automated payment flow, as shown in module 836. In some implementations, the wages module 836 may process payroll obligations and employee benefit payments as part of the business expense calculations that affect net revenue available for distribution. The module may interface with payroll systems and may ensure that all employment-related obligations are satisfied before calculating distributable profits.

An expenses module 838 may manage business operational expenses within the automated payment flow 828. In some aspects, the expenses module 838 may process and validate business expense claims, calculate net revenue after expenses, and ensure that all legitimate business costs are accounted for in the profit calculations. The module may incorporate expense validation algorithms and may interface with accounting systems to verify expense authenticity and appropriateness.

A government revenue module, such as module 840, may handle the distribution of funds to participating government entities. In some implementations, the government revenue module 840 may calculate and distribute the government entity's share of tax savings according to the established allocation formulas. The module may interface with government accounting systems and may generate the required documentation for public fund accountability and transparency requirements.

An interest module 842 may manage the distribution of tax-free municipal bond interest payments to former business owners. In some aspects, the interest module 842 may calculate and distribute the business owner's share of tax savings as tax-exempt municipal bond interest. The module may ensure compliance with federal tax regulations regarding municipal bond interest and may generate the required tax documentation for recipients.

In some implementations, the system architecture 800 may provide enhanced security, automation, and compliance capabilities compared to traditional system architectures. The blockchain infrastructure layer 802 may ensure transaction immutability and transparency, while the smart contract layer 804 may automate complex business logic and reduce the potential for human error. The oracle integration layer 812 may provide reliable access to external data sources, while the automated smart contract features 822 may enable monitoring and compliance capabilities. This comprehensive architecture may enable the tax management system 100 to operate with greater efficiency, security, and regulatory compliance while maintaining the flexibility and functionality required for successful tax-advantaged business transactions.

FIG. 9 depicts an example method 900 for facilitating tax-advantaged business transactions with automated risk mitigation through perpetual default mechanisms. In one aspect, method 900 can be implemented by the tax management system 100 of FIG. 1 and/or the system architecture 800 of FIG. 8.

Method 900 starts at block 902 and proceeds to block 904 with generating a conditional sales agreement between a government entity and a business owner for a term of one year or less. As described with respect to the transaction structure 200 of FIG. 2, the conditional sales agreement 204 establishes terms that delay the transfer of business assets until full payment is received, which, as explained below, never occurs due to the perpetual default mechanism. The contract generation module 116 of FIG. 1 may automatically create this agreement based on parameters established during the business valuation process.

Method 900 continues to block 906 with structuring a net revenue bond with interest obligations calculated using a business selling price of the business entity and applicable interest rates. As illustrated in the transaction structure 200 of FIG. 2, the net revenue bond 208 is specifically designed with interest obligations that exceed the business's capacity to pay from available profits. The business valuation module 112 of FIG. 1 interfaces with the industry data service 114 to calculate the business selling price using industry-specific price-to-earnings ratios. When multiplied by applicable interest rates, these ratios create obligations that intentionally exceed annual profits.

At block 908, method 900 proceeds with processing payments from business operations through automated withholding calculations. This step implements the daily operations 300 framework shown in FIG. 3, where the payment processing module 306 captures revenue streams 304 from business operations 302. The payment processing module

126 of FIG. 1 interfaces with both the banking system service 128 and the payment processor service 130 to facilitate real-time transaction processing, applying predetermined withholding rates to each transaction.

Method 900 continues at block 910 with calculating tax savings by comparing tax obligations under standard ownership versus government ownership structures. As demonstrated in the distribution calculation 318 of FIG. 3, the system determines the differential between what the business would pay in taxes under private ownership versus the tax-free status under government ownership. The revenue distribution module 118 of FIG. 1 processes this calculation to determine the total tax savings available for distribution.

At block 912, method 900 proceeds with structuring a distribution of funds to the business owner and the government entity based on the tax savings. Following the monthly distribution 314 process shown in FIG. 3, funds are allocated according to predetermined ratios: 50% to the former business owner 320 as tax-free municipal bond interest, 37.5% to the government entity 322 as business profit, and 12.5% to the program administrator 324. The revenue distribution module 118 ensures these distributions maintain the perpetual default status while providing tax advantages to all parties.

Method 900 continues at block 914 with receiving geographic information system (GIS) data indicating location-based hazards affecting the business entity. As illustrated in the risk management system 400 of FIG. 4, the GIS integration module 414 interfaces with the geographic information service 124 (FIG. 1) to obtain real-time data about natural disasters, infrastructure disruptions, civil events, and supply chain issues. The GIS display container 500 of FIG. 5 visualizes this data through the map display 502, showing hazard boundaries 616 and impacted business indicators 620.

At block 916, method 900 proceeds with correlating the geographic information system data with business performance metrics to generate composite risk scores. The risk analysis engine 434 of FIG. 4 employs the data correlation processor 436 to identify relationships between geographic hazards and revenue impacts. As shown in the threshold alert dashboard 600 of FIG. 6, the revenue monitoring module 602 interfaces with the geographic hazard module 604 to provide integrated risk assessment, with the risk score module 610 presenting quantitative assessments.

Method 900 continues at block 918 with automatically adjusting payment processing and fund distribution based on the composite risk scores. When risk levels change, the system modifies its operations according to the graduated responses defined in the risk management system 400. The automated smart contract features 822 of FIG. 8, including the threshold monitoring module 824, enable real-time adjustments to payment flows without manual intervention, ensuring business continuity while protecting all parties from excessive risk exposure.

At block 920, method 900 proceeds with triggering exit procedures when the composite risk scores exceed predetermined thresholds. As illustrated in FIG. 4, the auto opt-out trigger 446 initiates automatic exit procedures when critical risk conditions are detected. The perpetual default status 218 shown in FIG. 2 enables immediate termination without requiring complex asset transfer unwinding, as the government exit option 220 can be exercised instantly. The smart contract layer 804 of FIG. 8 executes these exit procedures through automated state transitions, maintaining immutable audit trails while allowing transaction reversal. Method 900 may end at block 922.

Method 900 provides technical benefits by solving the fundamental problem of transaction inflexibility in distributed financial systems. The perpetual default mechanism enables parties to maintain the benefits of ownership transfers while preserving the ability to exit quickly when conditions change. The integration of real-time GIS data with payment processing creates an automated risk management system that responds to real-world events within seconds rather than days or weeks. This technical solution transforms static ownership transfers into dynamic, responsive arrangements that automatically adapt to changing conditions while maintaining tax advantages and operational continuity. The method resolves the technical contradiction between blockchain finality and operational flexibility, offering a practical implementation that meets the needs of both government entities and business owners.

Note that FIG. 9 is just one example of a method, and other methods, including fewer, additional, or alternative operations, are possibly consistent with this disclosure.

Figure 10:
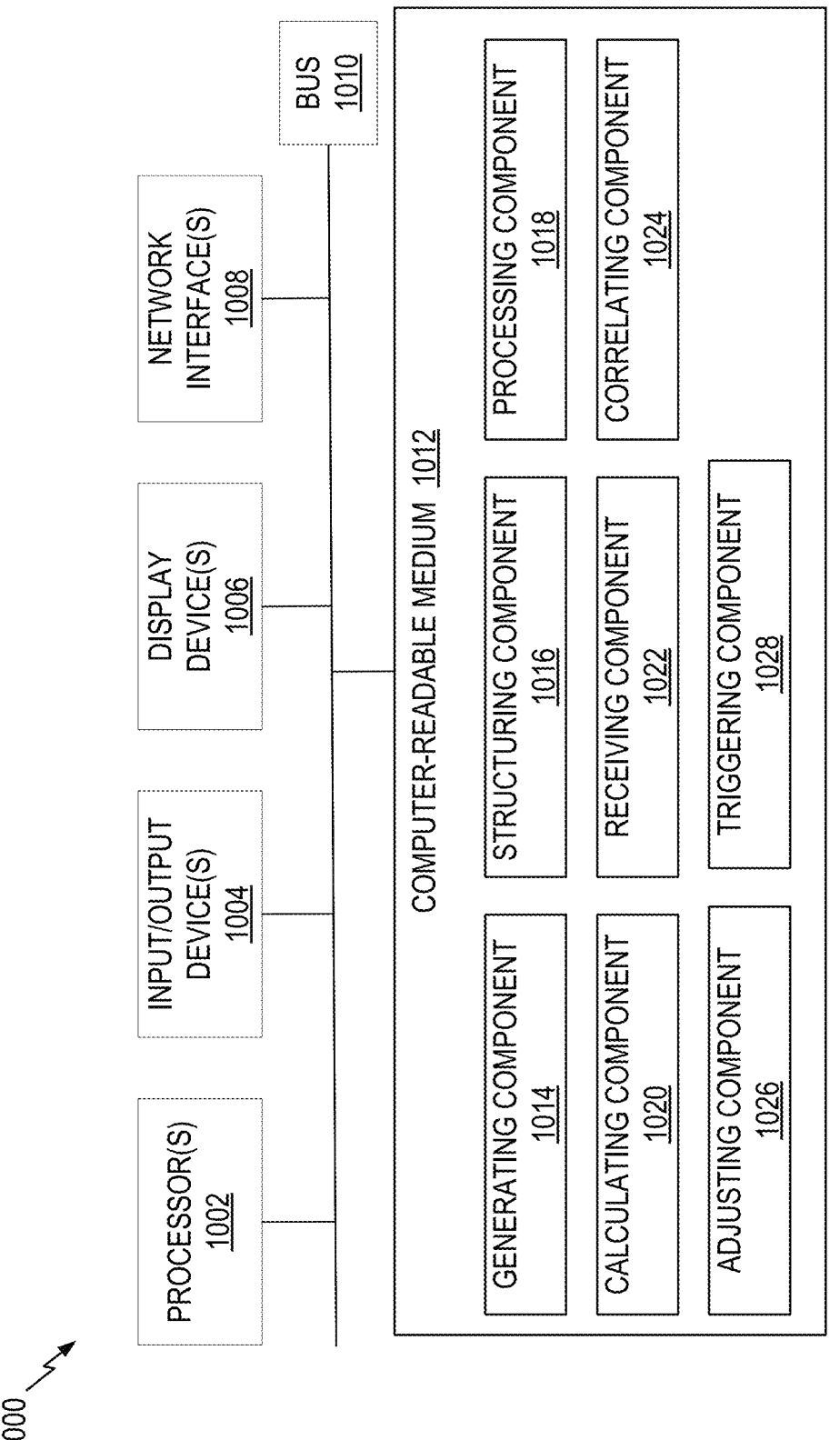
FIG. 10 illustrates a block diagram of a computing system for implementing tax-advantaged business transactions, according to aspects of the present disclosure.

FIG. 10 illustrates a block diagram of a system architecture 1000 configured to perform various aspects of the tax-advantaged business transaction system described herein. The system architecture 1000 may be implemented as an electronic device capable of executing computer-executable instructions, such as a personal computer, server, smartphone, or other computing device.

The system architecture 1000 includes a processor 1002, which may be configured to retrieve and execute instructions stored in the computer-readable medium 1012 or other memory components. The processor 1002 may be representative of one or more central processing units (CPUs), graphics processing units (GPUs), or other processing devices.

An input/output device 1004 is included for communicating information between the system architecture 1000 and a user. This may include input hardware such as keyboards, touchscreens, or microphones, as well as output mechanisms like speakers or haptic feedback devices.

A display device 1006 is provided for presenting visual information to the user. This may include internal or external displays capable of showing data, user interface elements, and graphical representations related to the tax-advantaged business transaction system.

A network interface 1008 enables the system architecture 1000 to connect to external networks and communicate with other systems. This may include wired or wireless communication transceivers for sending and receiving data over various network protocols.

The system bus 1010 facilitates data exchange among the various components of the system architecture 1000. While a single bus is depicted for simplicity, multiple buses may be implemented in practice.

The computer-readable medium 1012 may include volatile memory such as RAM or non-volatile memory such as NVRAM. It contains several functional components that enable the operation of the tax-advantaged business transaction system:

A generating component 1014 may be configured to create the conditional sales agreement and other documents.

A structuring component 1016 may handle the organization of the net revenue bond and other financial structures, such as the distribution of funds to the business owner and the government entity based on the tax savings.

A processing component 1018 may manage the payment processing from business operations.

A calculating component 1020 may perform tax savings calculations and other numerical operations.

A receiving component 1022 may handle the input of business financial data and other information.

A correlating component 1024 may analyze relationships between geographic information system data and business performance metrics.

An adjusting component 1026 may automatically modify payment processing and fund distribution based on risk assessments.

A triggering component 1028 may initiate exit procedures when risk thresholds are exceeded.

These components work together to enable the functionality of the tax-advantaged business transaction system, with the processor 1002 coordinating their operations through the system bus 1010.

It should be noted that FIG. 10 represents one example of a system architecture consistent with the aspects described herein, and other configurations with additional, alternative, or fewer components may be implemented within the scope of this disclosure.

In some implementations, the tax management system may facilitate interactions between various components to enable tax-advantaged business ownership transfers. The system may receive business financial data through a secure interface, which may then be processed by analytical modules to assess business qualifications and financial health. This data may be used to calculate a business selling price based on industry-specific valuation metrics and current market conditions.

Upon determining a suitable selling price, the system may generate a conditional sales agreement between the business owner and a matched government entity. This agreement may be created using standardized templates that incorporate specific terms based on the business valuation and program requirements. The system may utilize digital signature technology to facilitate remote execution of these agreements.

Once the agreement is in place, the system may begin processing payments from the business operations. This may involve integrating with point-of-sale systems or other financial tracking mechanisms to capture revenue data in real-time. The payment processing component may apply predetermined withholding rates to each transaction, segregating funds for tax purposes.

The system may then perform complex calculations to determine tax savings based on the processed payments. These calculations may take into account current tax rates, applicable deductions, and the specific terms of the conditional sales agreement. The tax savings calculations may be updated continuously as new transaction data is processed.

Based on the calculated tax savings, the system may initiate fund distribution processes. This may involve allocating portions of the tax savings to different participants according to predefined ratios. The distribution mechanism may interface with banking systems to execute electronic fund transfers to the appropriate accounts of business owners, government entities, and program administrators.

Throughout these processes, the system may maintain comprehensive data logs and generate detailed reports to ensure transparency and facilitate compliance with regulatory requirements. The system may also incorporate risk management features that continuously monitor business performance and external factors that could impact the tax-advantaged arrangement.

In some cases, the system may include requalification procedures that periodically reassess the eligibility of participating businesses and recalculate terms based on updated financial data. This may help ensure ongoing compliance with program requirements and optimize tax benefits over time.

The interactions between these various components may be orchestrated by a central processing unit that coordinates data flows, triggers appropriate actions based on predefined conditions, and maintains the overall integrity of the tax management system. This integrated approach may enable efficient execution of complex tax-advantaged business transactions while providing safeguards and oversight mechanisms.

A number of implementations have been described. Nevertheless, it will be understood that various modifications may be made without departing from the spirit and scope of the disclosure. Accordingly, other implementations are within the scope of the following claims.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A system for facilitating a tax-advantaged business transaction with automated risk mitigation, comprising:

at least one processor; and a memory storing instructions that, when executed by the at least one processor, cause the system to:

generate a conditional sales agreement between a government entity and a business entity of a business owner for a term of one year or less, wherein the conditional sales agreement delays transfer of business assets until full payment is received;

structure a net revenue bond with interest obligations calculated using a business selling price of the business entity and applicable interest rates, wherein such interest obligations exceed an annual net profit of the business entity available for debt service, thereby establishing a perpetual default condition that prevents asset transfer completion;

process payments from business operations through automated withholding calculations;

calculate tax savings by comparing tax obligations under standard ownership versus government ownership structures;

structure a distribution of funds to the business owner and the government entity based on the tax savings, wherein the distribution of funds maintains the perpetual default condition while providing tax-advantaged benefits;

receive geographic information system data indicating location-based hazards affecting the business entity;

correlate the geographic information system data with business performance metrics to generate composite risk scores;

automatically adjust payment processing and fund distribution based on the composite risk scores;

trigger exit procedures when the composite risk scores exceed predetermined thresholds, wherein the perpetual default condition enables immediate termination of the conditional sales agreement;

implement blockchain-based smart contracts that automatically execute terms of the conditional sales agreement;

record all transactions on an immutable distributed ledger while maintaining reversibility through the perpetual default condition;

utilize smart contract oracles to integrate real-time geographic information system data and payment information; and enforce automated compliance through smart contract logic that prevents unauthorized transactions.

2. The system of claim 1, wherein the instructions further cause the system to:

calculate the business selling price by multiplying net revenue by an industry-specific price-to-earnings ratio obtained from an industry data service;

generate the net revenue bond as an unregistered municipal bond with a term of less than one year; and structure interest payments to the business owner as tax-free municipal bond income.

3. The system of claim 2, wherein calculating the business selling price further comprises:

retrieving historical at least one price-to-earnings ratio for a business industry classification of the business entity;

adjusting the at least one ratio based on business-specific factors including revenue stability and growth trends; and generating a valuation report including a calculation methodology and data sources.

4. The system of claim 1, wherein the instructions further cause the system to:

generate a qualified management agreement that maintains operational control with the business owner while satisfying IRS Revenue Procedure requirements for qualified management contracts;

retain business licenses and permits in a name of the business owner throughout term; and maintain unchanged daily operations except for payment processing modifications.

5. The system of claim 1, wherein distributing funds comprises:

calculating daily withholding amounts by applying predetermined tax rates to each transaction; accumulating withheld funds in an escrow account;

performing monthly reconciliation of accumulated funds; and distributing funds according to predetermined ratios: 50% to the business owner as tax-free municipal bond interest, 37.5% to the government entity as business profit, and 12.5% to a program administrator as management fees.

6. The system of claim 5, wherein the monthly reconciliation further comprises:

comparing payment processor reports with escrow account deposits;

identifying and resolving discrepancies through automated exception handling;

generating reconciliation reports with variance analyses; and adjusting subsequent distributions based on reconciliation results.

7. The system of claim 1, wherein the blockchain-based smart contracts comprise:

a securing smart contract managing authentication and access control for all participants;

a sale smart contract automating the transfer of business assets with perpetual default logic;

a management smart contract enforcing operational agreements and payment distributions; and a risk monitoring smart contract that automatically triggers responses based on geographic information system data inputs.

8. The system of claim 1, wherein the instructions further cause the system to:

generate a visual dashboard displaying real-time metrics including at least one of: current tax savings calculations for each participating business, geographic risk indicators overlaid on a map interface, payment flow visualizations showing fund distributions, or alert notifications for risk threshold breaches; and update the visual dashboard in real-time as new geographic information system data and payment information is received.

9. The system of claim 8, wherein the visual dashboard further comprises:

interactive controls allowing users to adjust risk threshold parameters;

drill-down capabilities to examine individual business performance metrics;

predictive analytics displaying projected risk scenarios based on geographic information system data trends; and exportable reports for regulatory compliance documentation.

10. The system of claim 1, wherein distributing funds to the business owner and the government entity based on the tax savings comprises:

generating a distribution schedule that allocates specific percentages of the tax savings to each party;

calculating an exact amount due to each party based on the distribution schedule and a total tax savings for a current period of time;

verifying that the distribution of funds maintains the perpetual default condition by ensuring that allocated funds do not fully satisfy obligations of the net revenue bond;

initiating separate electronic fund transfers to accounts designated by the business owner and the government entity;

generating detailed distribution reports documenting an allocation methodology, tax savings calculations, and actual amounts transferred;

maintaining an audit trail of all fund distributions for compliance and transparency purposes; and automatically adjusting future distributions based on any changes in tax regulations or agreement terms while preserving the tax-advantaged business transaction.

11. A system for facilitating a tax-advantaged business transaction with automated risk mitigation, comprising: at least one processor; and a memory storing instructions that, when executed by the at least one processor, cause the system to: generate a conditional sales agreement between a government entity and a business entity of a business owner for a term of one year or less, wherein the conditional sales agreement delays transfer of business assets until full payment is received; structure a net revenue bond with interest obligations calculated using a business selling price of the business entity and applicable interest rates, wherein such interest obligations exceed an annual net profit of the business entity available for debt service, thereby establishing a perpetual default condition that prevents asset transfer completion; process payments from business operations through automated withholding calculations; calculate tax savings by comparing tax obligations under standard ownership versus government ownership structures; structure a distribution of funds to the business owner and the government entity based on the tax savings, wherein the distribution of funds maintains the perpetual default condition while providing tax-advantaged benefits; receive geographic information system data indicating location-based hazards affecting the business entity; correlate the geographic information system data with business performance metrics to generate composite risk scores; automatically adjust payment processing and fund distribution based on the composite risk scores; trigger exit procedures when the composite risk scores exceed predetermined thresholds, wherein the perpetual default condition enables immediate termination of the conditional sales agreement; implement blockchain-based smart contracts that automatically execute terms of the conditional sales agreement; record all transactions on an immutable distributed ledger while maintaining reversibility through the perpetual default condition; utilize smart contract oracles to integrate real-time geographic information system data and payment information; and enforce automated compliance through smart contract logic that prevents unauthorized transactions, generate a visual dashboard displaying real-time metrics including at least one of: current tax savings calculations for each participating business, geographic risk indicators overlaid on a map interface, payment flow visualizations showing fund distributions, or alert notifications for risk threshold breaches; and update the visual dashboard in real-time as new geographic information system data and payment information is received.

12. The system of claim 11, wherein the instructions further cause the system to:

calculate the business selling price by multiplying net revenue by an industry-specific price-to-earnings ratio obtained from an industry data service;

generate the net revenue bond as an unregistered municipal bond with a term of less than one year; and structure interest payments to the business owner as tax-free municipal bond income.

13. The system of claim 12, wherein calculating the business selling price further comprises:

retrieving at least one historical price-to-earnings ratio for a business industry classification of the business entity;

adjusting the at least one ratio based on business-specific factors including revenue stability and growth trends; and generating a valuation report including a calculation methodology and data sources.

14. The system of claim 11, wherein the instructions further cause the system to:

generate a qualified management agreement that maintains operational control with the business owner while satisfying IRS Revenue Procedure requirements for qualified management contracts;

retain business licenses and permits in a name of the business owner throughout term; and maintain unchanged daily operations except for payment processing modifications.

15. The system of claim 11, wherein distributing funds comprises:

calculating daily withholding amounts by applying predetermined tax rates to each transaction; accumulating withheld funds in an escrow account;

performing monthly reconciliation of accumulated funds; and distributing funds according to predetermined ratios: 50% to the business owner as tax-free municipal bond interest, 37.5% to the government entity as business profit, and 12.5% to a program administrator as management fees.

16. The system of claim 15, wherein the monthly reconciliation further comprises:

comparing payment processor reports with escrow account deposits;

identifying and resolving discrepancies through automated exception handling;

generating reconciliation reports with variance analyses; and adjusting subsequent distributions based on reconciliation results.

17. The system of claim 11, wherein the instructions further cause the system to:

implement blockchain-based smart contracts that automatically execute terms of the conditional sales agreement;

record all transactions on an immutable distributed ledger while maintaining reversibility through the perpetual default condition;

utilize smart contract oracles to integrate real-time geographic information system data and payment information; and enforce automated compliance through smart contract logic that prevents unauthorized transactions.

18. The system of claim 17, wherein the blockchain-based smart contracts comprise:

a securing smart contract managing authentication and access control for all participants;

a sale smart contract automating the transfer of business assets with perpetual default logic;

a management smart contract enforcing operational agreements and payment distributions; and a risk monitoring smart contract that automatically triggers responses based on geographic information system data inputs.

19. The system of claim 11, wherein the visual dashboard further comprises:

interactive controls allowing users to adjust risk threshold parameters;

drill-down capabilities to examine individual business performance metrics;

predictive analytics displaying projected risk scenarios based on geographic information system data trends; and exportable reports for regulatory compliance documentation.

20. The system of claim 11, wherein distributing funds to the business owner and the government entity based on the tax savings comprises:

generating a distribution schedule that allocates specific percentages of the tax savings to each party;

calculating an exact amount due to each party based on the distribution schedule and a total tax savings for a current period of time;

verifying that the distribution of funds maintains the perpetual default condition by ensuring that allocated funds do not fully satisfy obligations of the net revenue bond;

initiating separate electronic fund transfers to accounts designated by the business owner and the government entity;

generating detailed distribution reports documenting an allocation methodology, tax savings calculations, and actual amounts transferred;

maintaining an audit trail of all fund distributions for compliance and transparency purposes; and automatically adjusting future distributions based on any changes in tax regulations or agreement terms while preserving the tax-advantaged business transaction.

\* \* \* \* \*